(12) United States Patent
Kitano et al.

(10) Patent No.: US 8,808,609 B2
(45) Date of Patent: Aug. 19, 2014

(54) PROCESS OF MAKING A CARBON FIBER NONWOVEN FABRIC

(75) Inventors: Takahiro Kitano, Ishikawa (JP); Fujio Okino, Nagano (JP)

(73) Assignees: TEC One Co., Ltd., Nomi-shi (JP); Shinshu University, Matsumoto-shi (JP)

( * ) Notice: Subject to any disclaimer, the term of this patent is extended or adjusted under 35 U.S.C. 154(b) by 146 days.

(21) Appl. No.: 13/503,167

(22) PCT Filed: Sep. 17, 2010

(86) PCT No.: PCT/JP2010/066156
§ 371 (c)(1),
(2), (4) Date: Apr. 20, 2012

(87) PCT Pub. No.: WO2011/089754
PCT Pub. Date: Jul. 28, 2011

(65) Prior Publication Data
US 2012/0214375 A1    Aug. 23, 2012

(30) Foreign Application Priority Data

Jan. 21, 2010 (JP) ................................. 2010-011457

(51) Int. Cl.
| | | |
|---|---|---|
| *C01B 31/02* | (2006.01) | |
| *C01B 31/04* | (2006.01) | |
| *D01D 5/00* | (2006.01) | |
| *D01D 5/20* | (2006.01) | |
| *D01F 9/145* | (2006.01) | |
| *D01F 9/20* | (2006.01) | |
| *D04H 3/002* | (2012.01) | |

(52) U.S. Cl.
CPC ................ *D01D 5/0038* (2013.01); *D01D 5/20* (2013.01); *D01F 9/145* (2013.01); *D01F 9/20* (2013.01); *D04H 3/002* (2013.01)

USPC ......... 264/465; 264/29.2; 264/29.7; 264/103; 264/167; 423/447.8; 423/448

(58) Field of Classification Search
USPC ............... 264/10, 29.1, 29.2, 29.6, 29.7, 103, 264/464, 465, 466, 484, 167; 423/447.1, 423/447.7, 447.8, 448
See application file for complete search history.

(56) References Cited

U.S. PATENT DOCUMENTS

| | | | |
|---|---|---|---|
| 5,312,500 A | * | 5/1994 | Kurihara et al. ............. 156/62.4 |
| 6,844,061 B2 | * | 1/2005 | Morita et al. ................. 428/367 |

(Continued)

FOREIGN PATENT DOCUMENTS

| | | |
|---|---|---|
| CN | 1878898 | 12/2006 |
| CN | 1882724 | 12/2006 |

(Continued)

OTHER PUBLICATIONS

Ono., H., et al., "Preparation of highly crystalline carbon nanofibers from pitch/polymer blend," Carbon, vol. 44, pp. 682-686, (2006).

(Continued)

*Primary Examiner* — Leo B Tentoni
(74) *Attorney, Agent, or Firm* — Oblon, Spivak, McClelland, Maier & Neustadt, L.L.P.

(57) ABSTRACT

The present invention has an object of providing the carbon fiber (or the nonwoven fabric configured of the aforementioned carbon fiber) of which the surface area, the graphitization degree, and the fiber diameter are large, high, and small, respectively, and yet of which dispersion is small.
The method of producing the carbon fiber nonwoven fabric includes a dispersion liquid preparing step of preparing a dispersion liquid containing resin and pitch, an electrospinning step of producing the nonwoven fabric that is comprised of carbon fiber precursors with electrospinning from the aforementioned dispersion liquid, and a modifying step of modifying the carbon fiber precursors of the nonwoven fabric obtained in the aforementioned electrospinning step into the carbon fiber.

25 Claims, 7 Drawing Sheets

(56) References Cited

U.S. PATENT DOCUMENTS

2007/0054580 A1   3/2007   Sakurai et al.
2007/0122687 A1*  5/2007   Sakurai et al. ......... 423/447.2 X

FOREIGN PATENT DOCUMENTS

| | | |
|---|---|---|
| JP | 2007 207654 | 8/2007 |
| JP | 2008 270807 | 11/2008 |
| JP | 2009 505931 | 2/2009 |
| JP | 2009 79346 | 4/2009 |
| JP | 2009 203565 | 9/2009 |
| JP | 2009 256835 | 11/2009 |
| WO | 2005 028719 | 3/2005 |
| WO | 2006 054636 | 5/2006 |

OTHER PUBLICATIONS

Kim, C., et al., "Fabrication of Electrospinning-Derived Carbon Nanofiber Webs for the Anode Material of Lithium-Ion Secondary Batteries," Advanced Functional Materials, vol. 16, pp. 2393-2397, (2006).

Shiraishi, S., "Basic characterization of lithium ion capacitor," Carbon, vol. 240, pp. 250-252, (2009) (with English abstract).

International Search Report Issued Dec. 7, 2010 in PCT/JP10/66156 Filed Sep. 17, 2010.

Chinese Office Action in corresponding application No. 201080061999.0 dated Mar. 3, 2014.

* cited by examiner

PROCESS OF MAKING A CARBON FIBER NONWOVEN FABRIC

TECHNICAL FIELD

The present invention relates to carbon fiber.

BACKGROUND ART

An attention is paid to the carbon fiber in a field of batteries (for example, a lithium-ion battery and an electric double-layer capacitor) and fuel cells. In particular, an attention is paid to the carbon fiber nonwoven fabric as an electrode material of the aforementioned batteries. The aforementioned nonwoven fabric is configured of the carbon fiber of which a fiber diameter is 10 μm or so.

Recently, the nonwoven fabric configured of the carbon fiber of which the fiber diameter is 10 μm or less (for example, 1 μm 0 or so) has been required from a viewpoint of an augment in a surface area.

The carbon nanotube produced with a vapor growth method or an arc electric discharge method is known as the carbon fiber having a fine fiber diameter. A fiber length of the carbon nanotube, however, is short. For example, it is 10 # m or less. In addition, the carbon nanotube is expensive. Thus, an application of the carbon nanotube to the electrode material causes a problem.

From such a background, the carbon fiber produced with a melt blow method or an electrospinning method has been proposed.

For example, the method of spinning thermoplastic containing a carbon source (for example, pitch etc.) with the melt blow method, and thereafter, thermally decomposing, carbonizing and graphitizing the aforementioned thermoplastic has been proposed (Patent literature 1 and Non-patent literature 1). In accordance with this method, the carbon fiber having a fine fiber diameter is obtained. However, it is difficult to control the fiber diameter with the melt blow method. The carbon fiber obtained with the melt blow method is large in deviation of the fiber diameters The method (the electrospinning method) of electrospinning a solution having the carbon source (for example, a polymer such as polyacrylonitrile) dissolved therein, and thereafter, carbonizing and graphitizing it has been proposed (Patent literatures 2 to 5 and Non-patent literature 2). The carbon fiber obtained with this method is small in deviation of the fiber diameters. However, in the method described in the above-mentioned Patent Literatures 2 to 5, the carbon source has to be dissolved in a solvent. By the way, hard pitch and mesophase pitch are high in a graphitization degree. Thus, the hard pitch and the mesophase pitch are preferably employed as the carbon source. However, the hard pitch and the mesophase pitch are not dissolved in the solvent. Thus, the hard pitch and the mesophase pitch are not employed as the carbon source in the above-mentioned Patent Literatures. In the Patent literature 5, carbonization and the graphitization are performed with microwave heating after the electro spinning. Herein, carbon black is essential. The carbon black can be employed as the carbon source. However, the carbon black, similarly to polyacrylonitrile, is low in the graphitization degree. For this reason, only the carbon fiber of which the graphitization degree is low can be obtained.

The technology of performing the electrospinning with the pitch kept in a molten state and thereafter, carbonizing and graphitizing it has been proposed (Patent literature 6). The carbon fiber obtained with this method is small in deviation of the fiber diameters. And yet, the graphitization degree is high. However, only the carbon source of which the graphitization degree is high is employed in this technology, differently from the above-mentioned technologies. For this reason, shrinkage is small at the time of the carbonization and the graphitization. Thus, it is difficult to obtain the carbon fiber of which the fiber diameter is 1 μm or less. In addition, only soft pitch of which a melting point is 300° C. or lower is employed in the technology of the Patent literature 6. That is, the high pitch and the mesophase pitch of which the melting point is 300° C. or higher cannot be used. In principle, only the carbon fiber of which the surface is flat can be obtained in this method. That is, the carbon fiber having the characteristics of the present invention cannot be obtained.

CITATION LIST

Non-Patent Literature

NPL 1: H. Ono, A. Oya/Carbon 44 (2006) 682-686
NPl 2: Chan Kim, KapSeungYang, Masahito Kojima, Kazuto Yoshida, YongJung Kim, Yoong AhmKim and Morinobu Endo/Adv. Funct. Mater 16 (2006) 2393-2397
NPL 3: Shirai Sousi/Carbon 240 (2009) 250-252

Patent Literature

PTL 1: JP-P2009-079346A
PTL 2: JP-P2009-505931A
PTL 3: JP-P2008-270807A
PTL 4: JP-P2007-207654A
PTL 5: JP-P2006-054636A1
PTL 6: JP-P2009-203565A

SUMMARY OF INVENTION

Technical Problem

A task that the present invention is to solve, that is, an object of the present invention is to provide the carbon fiber (or the nonwoven fabric configured of the aforementioned carbon fiber) of which a surface area, a graphitization degree, a fiber diameter are large, high, and small, respectively, and yet of which deviation is small.

Solution to Problem

The aforementioned problems are solved by a method of producing carbon fiber nonwoven fabric, which is characterized in including a dispersion liquid preparing step of preparing a dispersion liquid containing resin and pitch, an electrospinning step of producing the nonwoven fabric comprised of carbon fiber precursors with electrospinning from the aforementioned dispersion liquid, and a modifying step of modifying the carbon fiber precursors of the nonwoven fabric obtained in the aforementioned electrospinning step into the carbon fiber.

Preferably, the aforementioned problems are solved by the aforementioned method of producing the carbon fiber nonwoven fabric, which is characterized in that the aforementioned modifying step includes a step of heating the nonwoven fabric obtained in the aforementioned electrospinning step to 50 to 4000° C.

Preferably, the aforementioned problems are solved by the aforementioned method of producing the carbon fiber nonwoven fabric, which is characterized in that the aforementioned modifying step includes a resin removing step of removing resin being included in the nonwoven fabric obtained in the aforementioned electrospinning step.

Preferably, the aforementioned problems are solved by the aforementioned method of producing the carbon fiber nonwoven fabric, which is characterized in that the aforementioned resin removing step is a heating step of heating the nonwoven fabric obtained in the aforementioned electrospinning step under an oxidizing gas atmosphere.

Preferably, the aforementioned problems are solved by the aforementioned method of producing the carbon fiber nonwoven fabric, which is characterized in that the aforementioned modifying step includes a carbonizing step of performing a carbonizing process for the nonwoven fabric subjected to the aforementioned resin removing step.

Preferably, the aforementioned problems are solved by the aforementioned method of producing the carbon fiber nonwoven fabric, which is characterized in that the aforementioned modifying step includes a graphitizing step of performing a graphitizing process for the nonwoven fabric subjected to the aforementioned carbonizing step.

Preferably, the aforementioned problems are solved by the aforementioned method of producing the carbon fiber nonwoven fabric, which is characterized in that the aforementioned graphitizing step is a heating step of heating the aforementioned nonwoven fabric under an inert atmosphere.

Preferably, the aforementioned problems are solved by the aforementioned method of producing the carbon fiber nonwoven fabric, which is characterized in that the aforementioned heating is heat generation due to electric current to the aforementioned nonwoven fabric.

Preferably, the aforementioned problems are solved by the aforementioned method of producing the carbon fiber nonwoven fabric, which is characterized in that the aforementioned resin is water-soluble resin.

Preferably, the aforementioned problems are solved by the aforementioned method of producing the carbon fiber nonwoven fabric, which is characterized in that the aforementioned resin is pyrolytic resin.

Preferably, the aforementioned problems are solved by the aforementioned method of producing the carbon fiber nonwoven fabric, which is characterized in that the aforementioned resin is polyvinyl alcohol.

Preferably, the aforementioned problems are solved by the aforementioned method of producing the carbon fiber nonwoven fabric, which is characterized in that the aforementioned pitch is mesophase pitch.

Preferably, the aforementioned problems are solved by the aforementioned method of producing the carbon fiber nonwoven fabric, which is characterized in that of the aforementioned pitch has a particle diameter of 1 nm to 10 μm.

Preferably, the aforementioned problems are solved by the aforementioned method of producing the carbon fiber nonwoven fabric, which is characterized in that aforementioned pitch has a particle diameter of 100 nm to 1 μm.

Preferably, the aforementioned problems are solved by the aforementioned method of producing the carbon fiber nonwoven fabric, which is characterized in that an amount of the aforementioned pitch is 20 to 200 parts by mass per 100 parts by mass of the aforementioned resin.

Preferably, the aforementioned problems are solved by the aforementioned method of producing the carbon fiber nonwoven fabric, which is characterized in that an amount of the aforementioned pitch is 70 to 150 parts by mass per 100 parts by mass of the aforementioned resin.

The aforementioned problems are solved by a method of producing carbon fiber, which is characterized in including a fabric unraveling step of obtaining the carbon fiber by unraveling the carbon fiber nonwoven fabric obtained by the aforementioned method of producing the carbon fiber nonwoven fabric.

Preferably, the aforementioned problems are solved by the aforementioned method of producing the carbon fiber, which is characterized in that the aforementioned fabric unraveling step is a step of pulverizing the aforementioned nonwoven fabric.

The aforementioned problems are solved by the carbon fiber obtained by the aforementioned method of producing the carbon fiber.

The aforementioned problems are solved by the carbon fiber, which is characterized in that the aforementioned carbon fiber includes a large diameter portion and a small diameter portion, a diameter of the aforementioned large diameter portion is 20 nm to 2 μm, a diameter of the aforementioned small diameter portion is 10 nm to 1 μm, and (the diameter in the aforementioned large diameter portion)>(the diameter in the aforementioned small diameter portion).

Preferably, the aforementioned problems are solved by the aforementioned carbon fiber, which is characterized in that (a maximum value of the diameter in the aforementioned large diameter portion)/(a minimum value of the diameter in the aforementioned small diameter portion) is 1.1 to 100.

Preferably, the aforementioned problems are solved by the aforementioned carbon fiber, which is characterized in that a length of the aforementioned small diameter portion is longer than a minimum value of the diameter in the aforementioned large diameter portion.

Preferably, the aforementioned problems are solved by the aforementioned carbon fiber, which is characterized in that the length of the aforementioned small diameter portion is shorter than the maximum value of the diameter in the aforementioned large diameter portion.

Preferably, the aforementioned problems are solved by the aforementioned carbon fiber, which is characterized in that the length of the aforementioned small diameter portion is 10 nm to 10 μm.

Preferably, the aforementioned problems are solved by the aforementioned carbon fiber, which is characterized in that the length of the aforementioned large diameter portion is 50 nm to 10 μm.

Preferably, the aforementioned problems are solved by the aforementioned carbon fiber, which is characterized in that the aforementioned carbon fiber includes the aforementioned large diameter portions in plural number and yet the aforementioned small diameter portions in plural number, and a length of the aforementioned carbon fiber is 0.1 to 1000 μm.

Preferably, the aforementioned problems are solved by the aforementioned carbon fiber, which is characterized in that a specific surface area of the aforementioned carbon fiber is 1 $m^2/g$ to 100 $m^2/g$.

Preferably, the aforementioned problems are solved by the aforementioned carbon fiber, which is characterized in that a peak originating in a graphite structure (002) exists within a range of 25° to 30° (2θ) in an X-ray diffraction measurement of the aforementioned carbon fiber, and a half width of the aforementioned peak is 0.1° to 2° (2θ).

Preferably, the aforementioned problems are solved by the aforementioned carbon fiber, which is characterized in that ID/IG (ID is a peak intensity existing within 1300 $cm^{-1}$ to 1400 $cm^{-1}$ in Raman scattering spectra of the aforementioned carbon fiber. IG is a peak intensity existing within 1580 $cm^{-1}$ to 1620 $cm^{-1}$ in Raman scattering spectra of the aforementioned carbon fiber.) of the aforementioned carbon fiber is 0.2 to 2.

Preferably, the aforementioned problems are solved by the aforementioned carbon fiber, which is characterized in that $L/(S)^{1/2}$ (S is an area of the aforementioned carbon fiber in an image obtained by observing the aforementioned carbon fiber with a scanning electron microscope. L is an outer length of the aforementioned carbon fiber in the image obtained by observing the aforementioned carbon fiber with the scanning electron microscope.) of the aforementioned carbon fiber is 3.7 to 300.

Preferably, the aforementioned problems are solved by the aforementioned carbon fiber, which is obtained with the aforementioned method of producing the carbon fiber.

The aforementioned problems are solved by carbon fiber nonwoven fabric, which is characterized in that a containing ratio of the aforementioned carbon fiber is 50 to 100% by mass.

The aforementioned problems are solved by carbon fiber nonwoven fabric, which is obtained with the aforementioned method of producing the carbon fiber nonwoven fabric.

Preferably, the aforementioned problems are solved by the aforementioned carbon fiber nonwoven fabric, which is characterized in that a thickness of the aforementioned nonwoven fabric is 0.1 μm to 10 mm.

Preferably, the aforementioned problems are solved by the aforementioned carbon fiber nonwoven fabric, which is characterized in that a weight of the aforementioned nonwoven fabric is 0.1 μm to 10000 g/m².

Preferably, the aforementioned problems are solved by the aforementioned carbon fiber nonwoven fabric, which is characterized in that a specific surface area of the aforementioned nonwoven fabric is 1 to 50 m²/g.

The aforementioned problems are solved by a member to be employed for electric devices, which is characterized in being configured by employing the aforementioned carbon fiber or the aforementioned carbon fiber nonwoven fabric.

Preferably, the aforementioned problems are solved by the aforementioned member to be employed for electric devices, which is characterized in being a battery part.

Preferably, the aforementioned problems are solved by the aforementioned member to be employed for electric devices, which is characterized in being an electrode of a battery.

Preferably, the aforementioned problems are solved by the aforementioned member to be employed for electric devices, which is characterized in being an electrode of a lithium-ion secondary battery.

Preferably, the aforementioned problems are solved by the aforementioned member to be employed for electric devices, which is characterized in being a negative electrode of a lithium-ion secondary battery, and containing an anode active material that is comprised of the aforementioned carbon fiber and/or the aforementioned carbon fiber nonwoven fabric.

Preferably, the aforementioned problems are solved by the aforementioned member being employed for electric devices, which is characterized in being an electrode of a lithium-ion secondary battery and including a conductive auxiliary that is comprised of the aforementioned carbon fiber and/or the aforementioned carbon fiber nonwoven fabric.

Preferably, the aforementioned problems are solved by the aforementioned member being employed for electric devices, which is characterized in that the aforementioned member is a negative electrode of a lithium-ion secondary battery employing an alloy-based anode active material, and the aforementioned alloy-based anode active material is laminated on the aforementioned carbon fiber and/or the aforementioned carbon fiber nonwoven fabric.

Preferably, the aforementioned problems are solved by the aforementioned member to be employed for electric devices, which are characterized in being an electrode of a capacitor.

Preferably, the aforementioned problems are solved by the aforementioned member to be employed for electric devices, which is characterized in being an electrode of a lithium-ion capacitor.

Preferably, the aforementioned problems are solved by the aforementioned member to be employed for electric devices, which is characterized in being a porous carbon electrode material for fuel cells.

The aforementioned problems are solved by an electric devise, which is characterized in including the member to be employed for an electric element.

The aforementioned problems are solved by a filter, which is configured by employing the aforementioned carbon fiber or the aforementioned carbon fiber nonwoven fabric.

Advantageous Effect of Invention

The carbon fiber of which the surface area and the graphitization degree and the fiber diameter are large, high and small, respectively, and yet of which deviation is few can be obtained.

The carbon fiber nonwoven fabric having the aforementioned features can be obtained in a simplified manner. The surface area of the above nonwoven fabric is large.

The carbon fiber and the nonwoven fabric having the aforementioned features are suitable, for example, for the electrode materials. In particular, a speed at which the electrolyte solution is poured is high because the surface area is large, and thus, a takt time can be shortened.

The carbon fiber having the aforementioned features is large in an aspect ratio and high in conductivity. Thus, employing the conductive auxiliary leads to a reduction in an internal resistance of the battery.

The carbon fiber and the nonwoven fabric having the aforementioned features can be employed, for example, for the filters.

DESCRIPTION OF EMBODIMENTS

Figure 1:
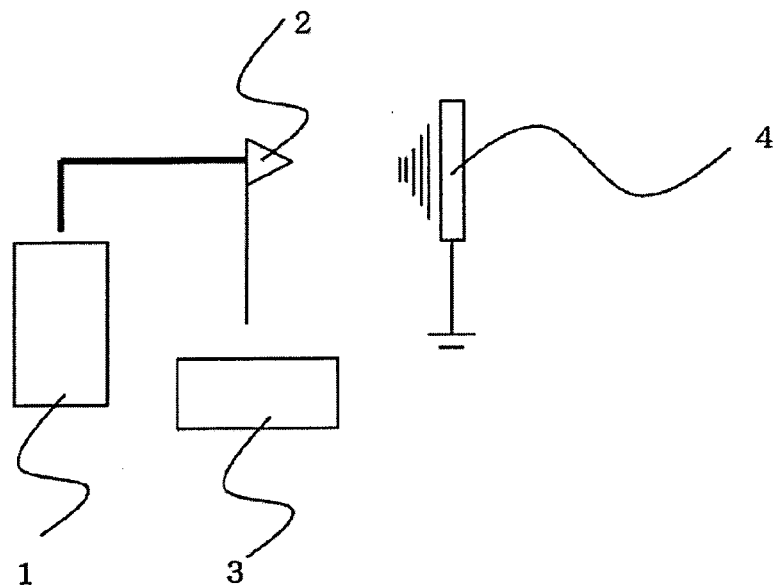
FIG. 1 is a schematic view of the electrospinning apparatus.

A first invention is a method of producing the carbon fiber nonwoven fabric. The aforementioned producing method includes a dispersion liquid preparation step. This dispersion liquid preparation step is a step of preparing a dispersion liquid containing resin and pitch (carbon particles). The aforementioned producing method includes an electrospinning step. This electrospinning step is a step of electrospinning the aforementioned dispersion liquid. This electrospinning step allows the nonwoven fabric that is comprised of carbon fiber precursors to be produced. The aforementioned producing method includes a modifying step. This modifying step is a step of modifying the carbon fiber precursors of the nonwoven fabric obtained in the aforementioned electrospinning step into the carbon fiber.

The aforementioned modifying step includes a heating step. In this heating step, the aforementioned nonwoven fabric (the nonwoven fabric made of the carbon fiber precursors) is heated, for example, to 50 to 4000° C.

The aforementioned modifying step preferably includes a resin removing step. This resin removing step is a step of removing resin being included in the nonwoven fabric obtained in the aforementioned electrospinning step. The aforementioned resin removing step is, for example, a heating step. This heating step is a step of heating the nonwoven fabric (the nonwoven fabric obtained in the aforementioned electrospinning step), for example, under an oxidizing gas atmosphere. The aforementioned modifying step preferably includes a carbonizing step. This carbonizing step is a step of performing a carbonizing process for the nonwoven fabric (in particular, the nonwoven fabric subjected to the aforementioned resin removing step). The aforementioned modifying step preferably includes a graphitizing step. This graphitizing step is a step of performing a graphitizing process for the nonwoven fabric (in particular, the nonwoven fabric subjected to the aforementioned carbonizing step). The aforementioned graphitizing step is, for example, a heating step. This heating step is a step of heating the nonwoven fabric (in particular, the nonwoven fabric subjected to the aforementioned carbonizing step), for example, under an inert atmosphere. The aforementioned heating step is, for example, a heat generating step due to electric current to the nonwoven fabric (in particular, the nonwoven fabric subjected to the aforementioned carbonizing step).

The aforementioned resin is preferably is water-soluble resin. The aforementioned resin is preferably pyrolytic resin. In particular, the aforementioned resin is preferably water-soluble and yet pyrolytic resin. The most preferable resin is polyvinyl alcohol. The aforementioned carbon particles are pitch. The aforementioned pitch is preferably hard pitch or mesophase pitch. The most preferable pitch is the mesophase pitch. (An amount of the aforementioned pitch)/(an amount of the aforementioned resin) is preferably 0.2 to 2 (more preferably, 0.7 to 1.5) (mass ratio).

A second invention is a method of producing the carbon fiber. This method of producing the carbon fiber includes a fabric unraveling step. This fabric unraveling step is a step of unraveling the aforementioned nonwoven fabric (the carbon fiber nonwoven fabric obtained in the aforementioned first invention (the aforementioned method of producing the carbon fiber nonwoven fabric)). The aforementioned fabric unraveling step is, for example, a step of pulverizing the nonwoven fabric. The carbon fiber is obtained by the aforementioned fabric unraveling step.

A third invention is the carbon fiber. This carbon fiber includes a large diameter portion and a small diameter portion. The aforementioned large diameter portion is a portion having a large diameter. The aforementioned small diameter portion is a portion having a small diameter. The aforementioned carbon fiber preferably includes the aforementioned large diameter portions in plural number. The aforementioned carbon fiber preferably includes the aforementioned small diameter portions in plural number. A diameter of the aforementioned large diameter portion is preferably 20 nm to 5 μm (yet preferably, 20 nm to 2 μm (more preferably, 50 nm to 1 μm)). A diameter of the aforementioned small diameter portion is preferably 10 nm to 3 μm (yet preferably, 10 nm to 1 μm (more preferably, 20 to 500 nm)). Needless to say, a condition A [(the diameter (an averaged value of the diameters) in the aforementioned large diameter portion)>(the diameter (an averaged value of the diameters) in the aforementioned small diameter portion)] is satisfied. Preferably, a condition B [(a maximum value of the diameter in the aforementioned large diameter portion)/(a minimum value of the diameter in the aforementioned small diameter portion)=1.1 to 100] is satisfied. Yet preferably, a condition C [(a maximum value of the diameter in the aforementioned large diameter portion)/(a minimum value of the diameter in the aforementioned small diameter portion)=2 to 50] is satisfied. A length of the aforementioned small diameter portion is, for example, longer than a minimum value of the diameter in the aforementioned large diameter portion. The length of the aforementioned small diameter portion is, for example, shorter than a maximum value of the diameter in the aforementioned large diameter portion. The length of the aforementioned small diameter portion is preferably 10 nm to 10 μm (more preferably, 50 nm to 1 μm). The length of the aforementioned large diameter portion is preferably 50 nm to 10 μm (more preferably, 500 nm to 3 μm). The length (full length) of the aforementioned carbon fiber is preferably 0.1 to 1000 μm (more preferably, 10 to 500 μm, and 0.5 to 10 μm in a case where the crushed carbon fiber is employed). A specific surface area of the aforementioned carbon fiber is preferably 1 to 100 m$^2$/g (more preferably, 2 to 50 m$^2$/g). A peak originating in a graphite structure (002) exists preferably within a range of 25° to 30° (2θ) in an X-ray diffraction measurement of the aforementioned carbon fiber. A half width of the aforementioned peak is 0.1° to 2°. The aforementioned carbon fiber preferably satisfies a condition D [ID/IG=0.1 to 2]. The aforementioned ID is a peak intensity existing within a range of 1300 cm$^{-1}$ to 1400 cm$^{-1}$ in Raman scattering spectra of the aforementioned carbon fiber. The aforementioned IG is a peak intensity existing within a range of 1580 cm$^{-1}$ to 1620 cm$^{-1}$ in Raman scattering spectra of the aforementioned carbon fiber. An Ar$^+$ laser is preferable as an excitation source to be employed at the time of the measurement. The aforementioned carbon fiber preferably satisfies a condition E [L/(S)$^{1/2}$=2 to 300, preferably, 5 to 300]. The aforementioned S is an area of the aforementioned carbon fiber in an image obtained by observing the aforementioned carbon fiber with a scanning electron microscope. The aforementioned L is an outer length of the aforementioned carbon fiber in the image obtained by observing the aforementioned carbon fiber with the scanning electron microscope. The carbon fiber of this feature is obtained with the aforementioned method of producing the carbon fiber (the preferable method of producing the carbon fiber).

A fourth invention is the carbon fiber nonwoven fabric. With regard to the above nonwoven fabric, a containing ratio of the aforementioned carbon fiber is preferably 50 to 100% by mass (more preferably, 80% or more by mass). The aforementioned nonwoven fabric is the nonwoven fabric obtained by the aforementioned first invention (the aforementioned method of producing the nonwoven fabric of the carbon fiber). A thickness of the aforementioned nonwoven fabric is preferably 0.1 µm to 10 mm (more preferably, 10 to 500 µm). A weight of the aforementioned nonwoven fabric is preferably 1 to 10000 g/m$^2$ (more preferably, 10 to 1000 g/m$^2$). A specific surface area of the aforementioned nonwoven fabric is preferably, 1 to 50 m$^2$/g (more preferably, 2 to 30 m$^2$/g).

A fifth invention is the electrode of the battery. This electrode is configured of the aforementioned carbon fiber (or the aforementioned carbon fiber nonwoven fabric). The aforementioned battery is, for example, a lithium-ion secondary battery. The aforementioned battery is, for example, a capacitor (an electric double-layer capacitor). The aforementioned capacitor is, for example, a lithium-ion capacitor.

A sixth invention is the battery. This battery is provided with the aforementioned electrodes.

A seventh invention is the filter. This filter is configured of the aforementioned carbon fiber nonwoven fabric (or the aforementioned carbon fiber).

Hereinafter, the present invention will be explained more detailedly.

[The dispersion liquid preparing step (step I)]

The aforementioned dispersion liquid contains the resin and the carbon particles.

The aforementioned resin is preferably resin that is dissolved in a solvent (a solvent that is volatilized at the time of the electrospinning). Specifically, the aforementioned resin is vinyl resin (for example, polyvinyl alcohol (PVA), polyvinylbutyral (PVB), and the like). Or the aforementioned resin is polyethylene oxide (PEO). Or the aforementioned resin is acrylic resin (for example, polyacrylic acid (PAA), polymethyl methacrylate (PMMA), polyacrylonitrile (PAN), and the like). Or, the aforementioned resin is fluorine resin (for example, polyvinylidene difluoride (PVDF), and the like). Or, the aforementioned resin is polymer from natural products (for example, cellulose resin and its derivatives (polylactic acid, chitosan, carboxymethylcellulose (CMC), hydroxyethylcellulose (HEC), and the like). Or, the aforementioned resin is engineering plastic resin such as polyethersulfone (PES). Or, the aforementioned resin is polyurethane rasin (PU). Or, the aforementioned resin is polyamide resin (nylon). Or, the aforementioned resin is aromatic polyamide resin (aramid resin). Or, the aforementioned resin is polyester resin. Or, the aforementioned resin is polystyrene resin. Or, the aforementioned resin is polycarbonate resin. Or, the aforementioned resin is a mixture or a copolymer of the aforementioned resin.

The aforementioned resin is preferably water-soluble resin from a viewpoint of a countermeasure for VOC (volatile organic compounds). The aforementioned resin is, for example, polyvinyl alcohol (PVA), polyvinylbutyral (PVB), polyethylene oxide (PEO), polyacrylic acid (PAA), or cellulose derivatives.

The preferable fiber is fiber of which fusion and bonding do not occur in the aforementioned resin removing step (the thermal treating step: the heating step). Preferably, the aforementioned resin is pyrolytic resin from this viewpoint. The pyrolytic resin is resin that is thermally decomposed before thermal deformation (fusion and bonding) when the resin is heated. The pyrolytic resin is, for example, polyvinyl alcohol, cellulose derivatives, polyacrylic acid (PAA) or wholly aromatic polyamide resin (aramid resin).

The aforementioned resin is preferably polyvinyl alcohol, cellulose derivatives or polyacrylic acid (PAA). The particularly preferable resin is polyvinyl alcohol.

The aforementioned solvent is preferably a solvent that is volatilized at the time of the electrospinning. The aforementioned solvent is, for example, water. Or the aforementioned solvent is acid (acetic acid, formic acid, and the like). Or the aforementioned solvent is alcohol (for example, methanol, ethanol, propanol, butanol, isobutyl alcohol, amyl alcohol, isoamyl alcohol and cyclohexanol). Or the aforementioned solvent is ester (for example, ethyl acetate and butyl acetate). Or the aforementioned solvent is ether (for example, diethyl ether, dibutyl ether and tetrahydrofuran). Or the aforementioned solvent is ketone (acetone, methyl ethyl ketone, methyl isobutyl ketone, and the like). Or the aforementioned solvent is an aprotic polar solvent (for example, N,N'-dimethyl formamide, dimethyl sulfoxide, acetonitrile and dimethyl acetamide). Or the aforementioned solvent is halogenated hydrocarbon (for example, chloroform, tetrachloromethane and hexafluoroisopropyl alcohol). Or the aforementioned solvent is a mixture of the aforementioned compounds.

The preferable solvent is water, alcohol or a mixture thereof from a viewpoint of a countermeasure for VOC (volatile organic compounds). The particularly preferable solvent is water.

For example, carbon black, fullerene and carbon nanotubes are known as the carbon particles. The carbon particles that are employed in this step 1 are pitch. The preferable pitch is the hard pitch or the mesophase pitch. The particularly preferable pitch is the mesophase pitch. In the present invention, the carbon particles other than the pitch are used together with the pitch. The pitch is substantially comprised of only carbon. The pitch is not dissolved in the aforementioned solvent. A fixed carbon content of the aforementioned mesophase pitch is preferably 50 to 100% (more preferably, 70 to 95% and yet more preferably, 80 to 90%). A melting point of the aforementioned mesophase pitch is preferably 250 to 400° C. (more preferably, 280 to 350° C. and yet more preferably, 300 to 330° C.). A particle diameter of the aforementioned carbon particles (a particle diameter of the carbon particles in the dispersion liquid) is preferably 10 to 1000 nm (more preferably, 50 nm or more, yet more preferably, 100 nm or more, more preferably, 500 nm or less, and yet more preferably, 300 nm or less).

The aforementioned pitch dispersion liquid includes carbon nanotubes responding to a necessity from a viewpoint of the strength and conductivity. The carbon nanotube is, for example, a single-walled carbon nanotube (SWNT). Or the carbon nanotube is, for example, a multi-walled carbon nanotube (MWNT). Or the carbon nanotube is a mixture thereof. The multi-walled carbon nanotube (MWNT) is employed from a viewpoint of practical use. As a method of incorporating the carbon nanotubes, the method is employed of adding carbon nanotube powders (or carbon nanotube dispersion liquid) to the pitch dispersion liquid. The aforementioned carbon nanotube dispersion liquid and the aforementioned pitch dispersion liquid are preferably mixed. An amount of the aforementioned carbon nanotubes is preferably 0.01 to 10 parts by mass (more preferably, 0.1 to 1 part by mass) per 100 parts by mass of the aforementioned pitch.

The aforementioned pitch (carbon particles) dispersion liquid includes a graphitization promoter responding to a necessity. The graphitization promoter is a catalyst having an effect of promoting the graphitization degree. The aforementioned graphitization promoter is, for example, borons (for example, boron, boric ester, boron carbide, and the like), or silicons (for example, silicon, silicic ester, silicon carbide, and the like). The preferable graphitization promoter is boron carbide or silicon carbide. An amount of the aforementioned graphitization promoter is preferably 1 to 10000 ppm by mass for the carbon particles (more preferable, 10 to 1000 ppm by mass). The aforementioned graphitization promoter and the aforementioned pitch dispersion liquid are mixed when the aforementioned graphitization promoter is liquid. At first, the dispersion liquid of the graphitization promoter is prepared when the aforementioned graphitization promoter is powders. And, the above dispersion liquid and the aforementioned pitch dispersion liquid are mixed.

The aforementioned pitch dispersion liquid includes a dispersant responding to a necessity. The aforementioned dispersant is, for example, a surfactant or a polymer. An amount of the aforementioned dispersant is preferably 1 to 200 parts by mass (more preferably, 10 to 100 parts by mass) per 100 parts by mass of the pitch.

A ratio of the aforementioned resin and the aforementioned pitch is preferably the following ratio. When the aforementioned resin is too much, the remaining carbon content after the carbonization becomes few. Contrarily, when the aforementioned resin is too few, the electrospinning becomes difficult. Thus, an amount of the aforementioned pitch is preferably 20 to 200 parts by mass (more preferably, 30 to 150 parts by mass) per 100 parts by mass of the aforementioned resin. When the carbon fiber having the aforementioned large diameter portion and the aforementioned small diameter portion should be acquired, an amount of the aforementioned pitch is preferably 50 to 200 parts by mass (more preferably, 70 to 150 parts by mass) per 100 parts by mass of the aforementioned resin.

When a density of solid (components other than the solvent) in the aforementioned dispersion liquid is too high, the spinning is difficult. Contrarily, also when the aforementioned density is too law, the spinning is difficult. Thus, a density of the aforementioned solid is preferably 0.1 to 50% by mass (more preferably, 1 to 30% by mass and yet more preferably, 5 to 20% by mass).

When a viscosity of the aforementioned dispersion liquid is too high, drawability is lacking at the time of the spinning. Contrarily, when the aforementioned viscosity is too law, the spinning is difficult. Thus, the viscosity of the aforementioned dispersion liquid (the viscosity at the time of the spinning: the viscosity measuring instrument is a coaxial double-cylindrical viscometer) is preferably 10 to 10000 mPa·S (more preferably, 50 to 5000 mPa·S and yet more preferably, 500 to 5000 mPa·S).

The preparation of the aforementioned dispersion liquid includes a mixing step and a refining step. The aforementioned mixing step is a step of mixing the aforementioned resin and the aforementioned pitch. The aforementioned refining step is a step of refining the aforementioned pitch. The aforementioned refining step is, for example, a step of affixing shear strength to the aforementioned pitch. This allows the pitch to be refined. It doesn't matter which step, out of the mixing step and the refining step, is firstly performed. They may be simultaneously performed.

In the aforementioned mixing step, there are three cases, namely, the case in which each of the aforementioned resin and the aforementioned pitch is powders, the case in which one is powders, and the other is a solution (dispersion liquid), and the case in which each of the aforementioned resin and the aforementioned pitch is a solution (dispersion liquid). The preferable case is that each of the aforementioned resin and the aforementioned pitch is a solution (dispersion liquid) from a viewpoint of operability.

In the aforementioned refining step, for example, a medialess beads mill is employed. Or a beads mill is employed. Or an ultrasound irradiation machine is employed. When foreign materials should be prevented from mixedly entering, the medialess beads mill is preferably employed. When a particle diameter of the carbon particles should be controlled, the beads mill is preferably employed. When the refining step should be performed in a simple operation, the ultrasound irradiation machine is preferably employed. In the present invention, the beads mill is preferably employed because a control of the particle diameter of the pitch (carbon particles) is important.

In the aforementioned dispersion liquid, when the particle diameter of the aforementioned pitch is too large, the fiber diameter becomes too large. When the particle diameter of the aforementioned pitch is too small, the dispersion condition becomes unstable. Thus, the aforementioned particle diameter is preferably 1 nm to 10 μm (more preferably, 10 nm to 1 μm).

[The Electrospinning Step (Step of Producing the Nonwoven Fabric that is Comprised of the Carbon Fiber Precursors) (Step II)]

The electrospinning apparatus is employed in this step.

For example, the electrospinning apparatus of FIG. 1 is employed. In FIG. 1, 1 is a pump-type spinning dope supplying apparatus. 2 is a nozzle-type exit. 3 is a voltage applying apparatus. 4 is a collector. The collector 4 is earthed. The aforementioned dispersion liquid (spinning dope) is forced to scatter toward the collector 4 from the exit 2. The solvent is volatilized at the time of this scattering. The spinning dope coming from the exit 2 is subjected to a drawing operation due to an electromagnetic field (the electromagnetic field applied by the voltage applying apparatus 3 (the electromagnetic field between the exit 2 and the collector 4)). The spinning dope arrives at the collector 4 while its solvent is volatilized. At a time point that the spinning dope arrives at the collector 4, it becomes fibrous (it is in a fiber-shape in which the solvent has been removed). The above fibrous substances, which are accumulated (deposited), become the nonwoven fabric.

Figure 2:
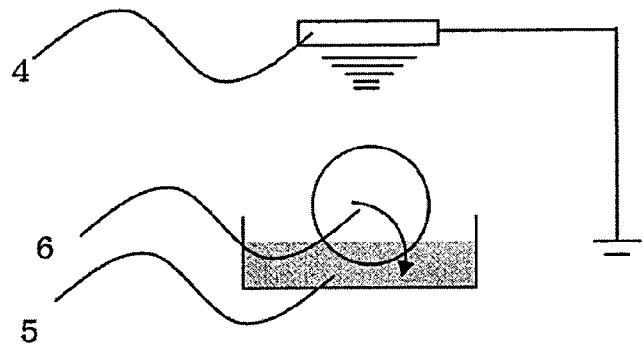
FIG. 2 is a schematic view of the electrospinning apparatus.

The spinning dope supplying apparatus is not limited to the apparatus of FIG. 1. The spinning dope supplying apparatus 1 is, for example, a syringe pump, a tube pump or a dispenser. The spinning dope supplying apparatus could be a pan-type spinning dope supplying apparatus (see FIG. 2, 5: a pan-type spinning dope supplying apparatus and 6: a drum-type exit). An inner diameter of the exit is 0.1 to 5 mm (preferably, 0.5 to 2 mm) when the exit has a nozzle shape. The exit is made of metal or non-metal. A waistline of the exit is flat-shaped or wire-shaped in the case of the drum type. The exit is made of metal in the case of the drum type.

The aforementioned voltage applying apparatus 3 is, for example, a DC high-voltage generator. Or the aforementioned voltage applying apparatus 3 is a Van de Graaff generator. The preferable applying voltage is 5 to 50 kV or so when the nozzle-type exit is employed. The preferable applying voltage is 10 to 200 kV or so when the drum-type exit is employed.

The aforementioned electromagnetic field strength is, for example, 0.1 to 5 kV/cm. When the electromagnetic field strength exceeds 5 kV/cm, breakdown of air easily occurs. When the electromagnetic field strength is small, namely, less than 0.1 kV/cm, the drawablility of the spinning dope is insufficient. For this, fiberization is difficult.

The aforementioned collector 4 is a confrontation-electrode type collector. However, the aforementioned collector is not a confrontation-electrode type collector in some cases. That is, when the collector is arranged between the exit and the confrontation electrode, the above collector is not a confrontation-electrode type collector. When the collector 4 is a confrontation-electrode type collector, the collector 4 is preferably configured of conductive materials (for example, metal) of which a volume resistivity is 10 E9 Ω·m or lower. The collector is configured of, for example, the nonwoven fabric. Or the collector is configured of fabric, knitted fabric, nets, flat plates, belts or the like. The collector is configured of liquid such as water and organic solvents in some cases. A configuration thereof assumes a piece by piece system in some cases, and assumes a roll-to-roll continuous system in some cases. The continuous operation type collector 4 is preferably employed from a viewpoint of production efficiency.

When a distance between the exit 2 and the collector 4 is too short, the solvent is not volatilized. When the aforementioned distance is too long, the voltage necessary is raised. The preferable distance is 5 cm to 1 m. The more preferable distance is 10 to 70 cm.

The nonwoven fabric obtained in this step is configured of the carbon fiber precursors. The carbon fiber precursors are a mixture of resin not subjected to the thermal treatment and the carbon particles (pitch). The aforementioned nonwoven fabric has a suitable thickness from a viewpoint of operability. A thickness of the nonwoven fabric after the carbonization (graphitization) is preferably 0.1 μm to 10 mm (more preferably, 1 μm or more, yet more preferably, 10 μm or more, more preferably, 1 mm or less and yet more preferably, 500 μm or less). A weight of the nonwoven fabric after the carbonization is preferably 1 to 1000 g/m$^2$ (more preferably, 10 to 500 g/m$^2$).

With the carbon fiber having irregularity (the carbon fiber having the large diameter portion (the portion in which the diameter of the carbon fiber is large) and the small diameter portion (the portion in which the diameter of the carbon fiber is small)), the features of the present invention are largely exhibited. When the surface of the carbon fiber is irregularly shaped, a surface area of the above carbon fiber is large. As a result, the features of the present invention are largely exhibited. The aforementioned fiber is preferably a fiber having the following size. The diameter of the aforementioned small diameter portion after the carbonization (graphitization) was preferably 10 nm to 1 μm (more preferably, 20 nm or more and more preferably, 500 nm or less). The diameter of the aforementioned large diameter portion after the carbonization (graphitization) was preferably 20 nm to 2 μm (more preferably, 50 nm or more, yet more preferably, 100 nm or more, more preferably, 1.5 μm or less and yet more preferably, 1 μm or less). Needless to say, the condition [(the diameter (an averaged value of the diameters) in the aforementioned large diameter portion)>(the diameter (an averaged value of the diameters) in the aforementioned small diameter portion)] is satisfied. It was when [(a maximum value of the diameter in the aforementioned large diameter portion)/(a minimum value of the diameter in the aforementioned small diameter portion)]=1.1 to 100 (more preferably, 2 or more, more preferably, 50 or less, and yet more preferably, 20 or less) that an effect for which the present invention aimed was largely exhibited. When the aforementioned large diameter portion became too large, the aforementioned fiber was easily cut off. When the aforementioned large diameter portion became too small, the effect for which the present invention aimed was small. The length of the aforementioned small diameter portion after the carbonization (graphitization) was preferably 10 nm to 10 μm (more preferably, 50 nm to 1 μm). The effect for which the present invention aimed was small also when the length of the aforementioned small diameter portion was too short and too long. The length of the aforementioned large diameter portion after the carbonization (graphitization) was preferably 50 nm to 10 μm (more preferably, 500 nm to 3 μm). The effect for which the present invention aimed was small also when the length of the aforementioned large diameter portion was too short and too long. The length of the aforementioned carbon fiber (a full length of one fiber) after the carbonization (graphitization) was preferably 0.1 to 1000 μm (more preferably, 10 to 500 μm, and 0.5 to 10 μm in the case that the carbon fiber was pulverized and employed). The effect for which the present invention aimed was small when the length of the aforementioned fiber was too short.

The specific surface area (BET specific surface area) of the aforementioned carbon fiber after the carbonization (graphitization) was preferably 1 to 100 m$^2$/g (more preferably, 2 to 50 m$^2$/g).

The peak originating in a graphite structure (002) of the aforementioned carbon fiber after the carbonization (graphitization) preferably exists within a range of 25° to 30° (2θ) in an X-ray diffraction measurement thereof. A half width of the aforementioned peak is 0.1° to 2° (more preferably, 0.1° to 1°). Crystallinity of the graphite is inferior when the aforementioned half width is too large. When the above carbon fiber was employed as the battery, performance thereof was inferior.

The aforementioned carbon fiber after the carbonization (graphitization) preferably satisfy the condition D [ID/IG=0.1 to 2]. More preferably, the aforementioned ratio is 0.1 to 1. The crystallinity of the graphite is inferior when the aforementioned ratio is too large. When the above carbon fiber was employed as the battery, performance thereof was inferior.

The aforementioned carbon fiber preferably satisfy the condition E [$L/(S)^{1/2}$=5 to 300]. More preferably, the aforementioned ratio was 50 to 200. The number of the fiber that enters a measurement range when the SEM observation is made is preferably 50 or more. That is, when the number of the fiber was 50 or more, a measurement error was small. A name of a program under which this operational processing was performed is "imageJ" (US National Institute of Mental Health/National Institute of Neurological Disorders and Stroke, Research Support Branch HP http://rsb.info.nih.gov/ij/index.html)

The carbon fiber constituting the nonwoven fabric of the present invention is preferably the carbon fiber having the aforementioned features. However, the carbon fiber having no aforementioned features may be incorporated. For example, the features of the present invention were not impaired so long as (an amount of the carbon fiber having the features of the present invention)/(an amount of the carbon fiber having the features of the present invention+an amount of the carbon fiber having no features of the present invention) ≥0.5 was satisfied. Preferably, the aforementioned ratio is 0.6 or more. More preferably, the aforementioned ratio is 0.7 or more. Yet more preferably, the aforementioned ratio is 0.8 or more. Most preferably, the aforementioned ratio is 0.9 or more.

Plural sheets of the aforementioned nonwoven fabric made of the carbon fiber precursors may be laminated. The laminated nonwoven fabric may be compressed with the roll. That is, the compression allows the membrane thickness and the density to be appropriately regulated.

The nonwoven fabric that is comprised of the carbon fiber precursors is peeled off from the collector and treated. Or the aforementioned nonwoven fabric is treated in a state of sticking to the collector.

[The Modifying Step (Step III)]

[The Thermal Treatment of the Aforementioned Nonwoven Fabric Made of the Carbon Fiber Precursors (Step III-1)]

The carbon fiber nonwoven fabric is obtained from the aforementioned nonwoven fabric made of the carbon fiber precursors. This is obtained by modifying the aforementioned carbon fiber precursors into the carbon fiber. The modifying process is, for example, a thermal treatment. In particular, the modifying process is a thermal treatment under the oxidative gas atmosphere. This thermal treatment allows the resin constituting the aforementioned carbon fiber precursors to be removed. That is, the carbon sources other than the carbon particles are removed. Yet, curing of the aforementioned carbon particles is performed.

This step is preferably performed after the aforementioned electrospinning step (the aforementioned step II).

The oxidative gas in this step is a compound containing oxygen atoms or an electron acceptor compound. The aforementioned oxidative gas is, for example, air, oxygen, halogen gas, nitrogen dioxide, ozone, water vapor, or carbon dioxide. From among them, the preferable oxidative gas is air from a viewpoint of cost performance and quick curing at a low temperature. Or the preferable oxidative gas is gas containing halogen gas. The aforementioned halogen gas is, for example, fluorine, iodine and bromine. From among them, the preferable halogen gas is iodine. Or the preferable halogen gas is mixture gas of the aforementioned components.

A temperature of the aforementioned thermal treatment is preferably 100 to 400° C. (more preferably, 150 to 350° C.). A time of the aforementioned thermal treatment is preferably 3 minutes to 24 hours (more preferably, 5 minutes to 2 hours).

The cured nonwoven fabric made of the carbon fiber precursors is obtained in this step. A softening temperature of this cured carbon fiber precursors is preferably 400° C. or higher (more preferably, 500° C. or higher).

The aforementioned resin is subjected to a crystallization process prior to this step when the aforementioned resin is crystalline resin. That is, the aforementioned resin is preferably kept for approximately one minute to one hour at a temperature equal to or more than a glass transition temperature, and yet equal to or less than a melting point. The glass transition temperature of polyvinyl alcohol is approximately 50 to 90 t, and the melting point thereof is 150 to 250° C.

This step is performed in a piece by piece system. Or this step is performed in a roll-to-roll continuous system. Or the aforementioned resin is thermally treated in a state of the roll. The preferable step is a roll-to-roll continuous thermal treatment process from a viewpoint of production efficiency.

[The Carbonizing Process (Step III-2)]

The carbonizing process is preferably performed in order to obtain the carbon fiber nonwoven fabric. This carbonizing process is a thermal treatment. This carbonizing process is preferably a thermal treatment under an inert gas atmosphere. The aforementioned cured carbon fiber precursors become the carbon fiber through this step. This step is preferably performed after the aforementioned step III-1.

The inert gas in this step is gas that does not chemically react to the cured carbon fiber precursors during the carbonizing process. The inert gas is, for example, nitrogen, argon and krypton. From among them, the preferable inert gas is nitrogen gas from a viewpoint of the cost.

A processing temperature of this step is preferably 500 to 2000° C. (more preferably, 600 to 1500° C.). The carbonization hardly progresses at a temperature less than 500° C. The graphitization occurs at a temperature exceeding 2000 t. However, when a graphitizing process to be later described is performed, a rise in the temperature exceeding 2000° C. is acceptable. A processing time of this step is preferably 5 minute to 24 hours (more preferably, 30 minute to 2 hours).

[The Graphitizing Process (Step III-3)]

The graphitizing process is preferably performed. The graphitizing process is preferably performed under an inert gas atmosphere. This step is an important step when the nonwoven fabric is employed for negative electrodes of the lithium-ion batteries and the like. This step is preferably performed after the aforementioned step III-2.

The inert gas in this step is gas that does not chemically react to the carbon fiber precursors during the graphitizing process. The inert gas is, for example, argon and krypton. Nitrogen gas is not preferable because it is ionized.

A processing temperature of this step is preferably 2000 to 3500° C. (more preferably, 2300 to 3200° C.). A processing time is preferably one hour or less (more preferably, 0.1 to 10 minutes).

This step is performed by keeping the carbon fiber precursors at the aforementioned temperature. In particular, the above step is performed by the electric current to the carbon fiber nonwoven fabric. That is, the aforementioned temperature is kept owing to Joule heat being generated due to the electric current. Also microwave heating enables the graphitization. The preferable graphitizing process is electric-current heating from a viewpoint of production cost. In particular, the continuous process using the roll-to-roll system is preferably performed.

[The Fiberizing Process (Step IV)]

This step is a step of obtaining the carbon fiber from the nonwoven fabric obtained in the aforementioned step. This step is a step of pulverizing the nonwoven fabric obtained, for example, by the aforementioned step II, the aforementioned step III-1, the aforementioned step III-2, or the aforementioned step III-3. Preferably, this step is a step of pulverizing the nonwoven fabric obtained by the aforementioned step III-2 and the aforementioned step III-3. Pulverizing the nonwoven fabric allows the fiber to be obtained.

For example, a cutter mill, a hammer mill, a pin mill, a ball mill, or a jet mill is employed for pulverizing the nonwoven fabric. Any method of the wet method and the dry method can be adopted. However, the dry method is preferably employed when the fiber is employed for a field such as nonaqueous electrolyte secondary batteries.

[The Electrodes]

The aforementioned carbon fiber nonwoven fabric (or the aforementioned carbon fiber) is employed for the members of the electric elements (the electronic elements are also included in the electric elements). For example, the aforementioned carbon fiber nonwoven fabric (or the aforementioned carbon fiber) is employed for the members of the batteries, the capacitors, the fuel cells and the like.

The aforementioned carbon fiber nonwoven fabric (or the aforementioned carbon fiber) is applied for the electrodes of the batteries. The batteries are, for example, a lead battery, a nickel-cadmium battery, a nickel-hydrogen battery, a lithium-ion battery, a sodium-sulfur battery and a redox flow battery. From among them, the carbon fiber nonwoven fabric (or the aforementioned carbon fiber) is applied for the electrodes of the lithium-ion battery. The aforementioned electrode is preferably a negative electrode. The aforementioned carbon fiber nonwoven fabric (or the aforementioned carbon fiber) is preferably applied to an anode active material. The aforementioned carbon fiber nonwoven fabric (or the aforementioned carbon fiber) is preferably applied to a conductant agent.

The lithium-ion battery is comprised of members such as positive electrodes, negative electrodes, separators, and an electrolyte solution. The positive electrode and the negative electrode are configured as follows. That is, the positive electrode and the negative electrode are configured by laminating a mixture including the active substance, the conductant agent, a binder and the like on a current collector (for example, aluminum foil and copper foil).

As the anode active material, the carbon materials such as non-graphitizable carbon, easily-graphitizable carbon, graphite, pyrolytic carbons, cokes, glass-like carbons, an organic polymer compound fired product, carbon fiber, or activated carbon can be listed. The materials containing at least one member selected from a group of a single body, an alloy and a compound of metal elements capable of forming an alloy with lithium as well as a single body, an alloy and a compound of semimetal elements capable of forming an alloy with lithium are employed (hereinafter, these are referred to as alloy-based anode active materials).

As the aforementioned metal element or semimetal element, tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) or hafnium (Hf) can be listed.

As an example of specific compounds, there exists LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, SiOv ($0<v\leq2$), SnOw ($0<w\leq2$), $SnSiO_3$, LiSiO, LiSnO or the like.

Lithium-titanium composite oxide (spinel-type composite oxide, ramstellite-type composite oxide, and the like) is also preferable.

The positive electrode active substance is acceptable so long as it is a substance capable of absorbing and releasing lithium ion. As a preferable example, for example, composite metal oxide containing lithium and olivine-type lithium phosphate can be listed.

The composite metal oxide containing lithium is metal oxide including lithium and transition metal. Or the composite metal oxide containing lithium is metal oxide in which one part of the transition metal in the metal oxide was replaced with different elements. The metal oxide containing at least one member or more selected from a group of cobalt, nickel, manganese and iron as the transition metal element is more preferable.

As an specific example of the composite metal oxide containing lithium, for example, $Li_kCoO_2$, $Li_kNiO_2$, $Li_kMnO_2$, $Li_kCo_mNi_{1-m}O_2$, $Li_kCo_mM_{1-m}O_n$, $Li_kMn_2O_4$ and $Li_kMn_{2-m}MnO_4$ (M is at least one element selected from a group of Na, Mg, Sc, Y, Mn, Fe, Co, Ni, Cu, Zn, Al, Cr, Pb, Sb and B. k=0 to 1.2, m=0 to 0.9, and n=2.0 to 2.3) can be listed.

The compound (lithium-iron phosphorus oxide) with an olivine-type crystalline structure represented by a general formula $Li_xFe_{1-y}M_yPO_4$(M is at least one element selected from a group of Co, Ni, Cu, Zn, Al, Sn, B, Ga, Cr, V, Ti, Mg, Ca and Sr. $0.9<x<1.2$ and $0\leq y<0.3$) can be listed. As such lithium-iron phosphorus oxide, for example, $LiFePO_4$ is preferred.

The compounds represented by a general formula X—S—R—S—(S—R—S)n-S—R—S—X' described in European Patent No. 415856 are employed as lithium thiolate.

The separator is configured of porous membranes made of synthetic resin (for example, polyurethane, polytetrafluoroethylene, polypropylene and polyethylene), or porous membranes made of ceramics. The separator having two kinds of the porous membranes or more laminated therein may be used.

The electrolyte solution contains the non-aqueous solvents and the electrolyte salts. The non-aqueous solvents are, for example, cyclic carbonate (propylene carbonate, ethylene carbonate and the like), chain esters (diethyl carbonate, dimethyl carbonate, ethylmethyl carbonate and the like), ethers (γ-butyrolactone, sulfolane, 2-methyltetrahydrofuran, dimethoxyethane and the like). They could be single and a mixture of plural kinds. Carbonate is preferable from a viewpoint of oxidative stability.

The electrolyte salts are, for example, $LiBF_4$, $LiClO_4$, $LiPF_6$, $LiSbF_6$, $LiAsF_6$, $LiAlCl_4$, $LiCF_3SO_3$, $LiCF_3CO_2$, LiSCN, lower aliphatic lithium carboxylate, LiBCl, $LiB_{10}Cl_{10}$, lithium halides (LiCl, LiBr, LiI and the like), haloborates (bis(1,2-benzenediolate(2-)-O,O') lithium borate, bis(2,3-naphthalenediolate(2-)-O,O') lithium borate, bis(2,2'-biphenyldiolate(2-)-O,O') lithium borate, bis(5-fluoro-2-olate-1-benzenesulfonic acid-O,O') lithium borate and the like), and imide salts ($LiN(CF_3SO_2)_2$, $LiN(CF_3SO_2)(C_4F_9SO_2)$, and the like). Lithium salts such as $LiPF_6$ and $LiBF_4$ are preferable. $LiPF_6$ is particularly preferable.

The gel-like electrolyte in which the electrolyte solution has been kept in the polymer compound may be employed as the electrolyte solution. The aforementioned polymer compounds are, for example, polyacrylonitrile, poly(vinylidene fluoride), a copolymer of poly(vinylidene fluoride) and polyhexafluoropropylene, polytetrafluoroethylene, polyhexafluoropropylene, polyethylene oxide, polypropylene oxide, polyphosphazene, polysiloxane, poly(vinyl acetate), poly(vinyl alcohol), poly(methyl methacrylate), polyacrylate, polymethacrylate, styrene-butadiene rubber, nitrile-butadiene rubber, polystyrene and polycarbonate. The polymer compounds having structures of polyacrylonitrile, poly(vinylidene fluoride), polyhexafluoropropylene and polyethylene oxide are preferable from a viewpoint of electrochemical stability.

The conductant agents are, for example, graphite (natural graphite, artificial graphite and the like), carbon black (acetylene black, ketjen black, channel black, furnace black, lamp black, thermal black and the like), conductive fiber (carbon fiber and metal fiber), metal (Al etc.) powder, conductive whiskers (zinc oxide, potassium titanate and the like), conductive metal oxide (titanium oxide and the like), organic conductive materials (phenylene derivatives and the like) and fluorinated carbon.

The binders are, for example, poly(vinylidene fluoride, polytetrafluoroethylene, polyethylene, polypropylene, aramid resin, polyamide, polyimide, poly(amide-imide), polyacrylonitrile, polyacrylate, methyl polyacrylate, ethyl polyacrylate, hexyl polyacrylate, polymethacrylate, methyl polymethacrylate, ethyl polymethacrylate, hexyl polymethacrylate, poly(vinyl acetate), polyvinylpyrrolidone, polyether, polyether sulphone, hexafluoropolypropylene, styrene-butadiene rubber, modified acrylic rubber and carboxymethyl cellulose.

Figure 3:
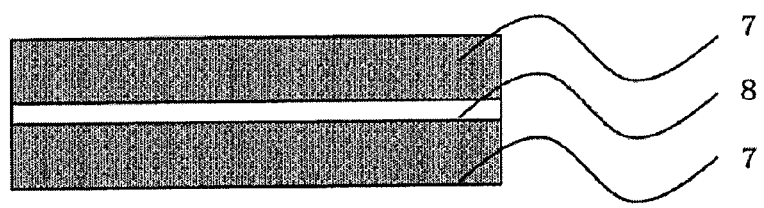
FIG. 3 is a schematic view of the negative electrode of the lithium-ion battery.

The negative electrode of the lithium-ion battery, as a rule, is produced by laminating the anode active material (for example, the graphite material) 7 on a current collecting electrode plate (for example, copper foil) 8 (see FIG. 3). The material of the present invention can be employed for both of the anode active material and the current collecting electrode. The material of the present invention can be employed only for the anode active material. When the material in accordance with the present invention is employed for the active substance, the nonwoven fabric can be employed as it stands. Or, the material in accordance with the present invention can be also employed by crushing into powder. When the material in accordance with the present invention is crushed into powder and is employed, the material in accordance with the present invention can be configured only of the aforementioned carbon fiber. Additionally, the material in accordance with the present invention may be employed together with the conventional active substances. In such a case, an amount of the aforementioned carbon fiber is preferably 0.1 to 50% by mass per an amount of all anode active materials. The case that an amount of the carbon fiber is 1 to 30% by mass is more preferable. The case that an amount of the carbon fiber is 1 to 10% by mass is particularly preferable.

The aforementioned carbon fiber nonwoven fabric (or the aforementioned carbon fiber) is also employed as the conductive auxiliary. The materials having no conductivity such as lithium cobalt oxide are employed for the positive electrodes of the lithium-ion batteries. When the aforementioned carbon fiber nonwoven fabric (or the aforementioned carbon fiber) is employed, the internal resistance is reduced. When the alloy-based negative electrode materials having low conductivity are employed in lithium-ion batteries, the aforementioned carbon fiber nonwoven fabric (or the aforementioned carbon fiber) can be utilized as the conductive auxiliary of the negative electrodes. An amount of the conductive auxiliaries is 0.1 to 20% by mass (more preferably, 0.5 to 10% by mass and particularly preferably, 0.5 to 3% by mass) per an amount of all active substances that are employed for the electrodes.

The aforementioned carbon fiber nonwoven fabric (or the aforementioned carbon fiber) is employed as a mother material of the alloy-based anode active material in the lithium-ion battery. When an alloy of silicon or tin and the carbon material is employed as the anode active material, a charge/discharge capacity is large. As it is, in this case, the problem that a change in the volume of the active substance due to the charge/discharge is large surfaces. By the way, in this case, there exist pores in the aforementioned carbon fiber nonwoven fabric (or the aforementioned carbon fiber). Thus, when the aforementioned alloy (the anode active material) is laminated on the aforementioned carbon fiber nonwoven fabric (or the aforementioned carbon fiber), that is, when the aforementioned carbon fiber nonwoven fabric (or the aforementioned carbon fiber) is employed as the mother material of the anode active material, a change in the volume of the active substance at the time of the charge/discharge is alleviated. This allows the lithium-ion battery having a high cyclic property to be obtained. With regard to the aforementioned carbon fiber nonwoven fabric (or the aforementioned carbon fiber) and the alloy-based anode active material, the following ratio thereof is preferable. An amount of the alloy-based anode active material is 0.01 to 1000% by mass per the aforementioned carbon fiber nonwoven fabric (or the aforementioned carbon fiber). In addition, it is 0.1 to 100% by mass. Particularly, it is 0.1 to 30% by mass.

A method of immersing the aforementioned carbon fiber nonwoven fabric (or the aforementioned carbon fiber) into a solution containing the anode active material is employed in order to affix the alloy-based anode active material to the aforementioned carbon fiber nonwoven fabric (or the aforementioned carbon fiber). Or, a method of coating the aforementioned carbon fiber nonwoven fabric (or the aforementioned carbon fiber) with the solution containing the anode active material is employed. Or, a physical depositing method or a chemical depositing method may be employed. For example, a vacuum evaporation method, a sputtering method, an ion plating method, or a laser ablation method may be employed. A CVD (Chemical Vapor Deposition) method may be employed. A hot CVD method and a plasma CVD method may be employed. A wet-type plating method may be employed instead of the above-mentioned dry-type plating method. For example, an electroplating method or an electroless plating method may be employed. In addition to them, a sintering method may be employed. For example, an atmospheric sintering method, a reactive sintering method or a hot press sintering method may be employed.

Figure 4:
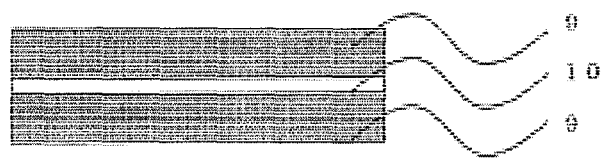
FIG. 4 is a schematic view of the negative electrode of the lithium-ion capacitor.

The aforementioned carbon fiber nonwoven fabric (or the aforementioned carbon fiber) is applied for the electrode of the capacitor. The aforementioned capacitor is an electric double-layer capacitor. The aforementioned capacitor is a lithium-ion capacitor. The aforementioned electrode is preferably a negative electrode. The negative electrode of the lithium-ion capacitor, as a rule, is produced by laminating the anode active material (for example, a graphite material) 9 on a current collecting electrode plate (for example, copper foil) 10 (see FIG. 4). The material in accordance with the present invention is employed for both of the anode active material and the current collecting electrode. The material in accordance with the present invention is employed only for the anode active material. When the material in accordance with the present invention is employed only for the active substance, the nonwoven fabric can be employed as it stands. Or, the material in accordance with the present invention may be employed by crushing into powder.

Figure 23:
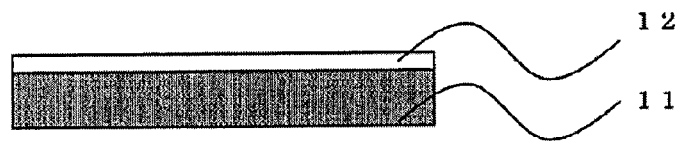
FIG. 23 is a cross-sectional view of an anode electrode.

The aforementioned carbon fiber nonwoven fabric (or the aforementioned carbon fiber) is applied for the material of the porous carbon electrode of the fuel cell. The aforementioned fuel cell is a solid polymer type fuel cell. The aforementioned electrode is preferably an anode. The anode of the solid polymer type fuel cell, as a rule, is produced by laminating a catalyst layer 12 that is comprised of platinum-supported carbon and polymer electrolyte on a porous carbon electrode material 11 (FIG. 23)

[Filter]

The aforementioned carbon fiber nonwoven fabric (or the aforementioned carbon fiber) is employed for collecting or classifying the particles. That is, the aforementioned carbon fiber nonwoven fabric (or the aforementioned carbon fiber) is employed as a filter.

Hereinafter, the examples are listed for explaining the present invention. However, the present invention is not limited to the following examples.

EXAMPLES

Example 1

Polyvinyl alcohol of 100 g (product name: POVAL 117: produced by KURARAY CO. LTD.), mesophase pitch of 120 g (product name: AR: produced by MITSUBISHI GAS CHEMICAL COMPANY. INC.) and water of 800 g were mixed with the beads mill. This allowed the mesophase pitch dispersion liquid having polyvinyl alcohol dissolved therein to be prepared. The particle diameter of the carbon particles within this dispersion liquid was 200 nm (measuring apparatus: LA-950: manufactured by HORIBA, Ltd.). The viscosity of the dispersion liquid was 4500 mPa·S (measuring apparatus: BH type Viscometer: manufactured by TOKIMEC INC.).

The electrospinning apparatus (see FIG. 1, nozzle diameter; 1.0 mm, collector (current collecting electrode); aluminum foil, distance between the nozzle and the collector; 10 cm, voltage: 10 kV) was employed. That is, the electrospinning was performed by employing the above-mentioned dispersion liquid. The nonwoven fabric made of the carbon fiber precursors was produced on the collector.

The above-mentioned nonwoven fabric was laminated. This laminated nonwoven fabric was heated for 10 minutes at a temperature of 150° C. in the air. Thereafter, it was heated for one hour at a temperature of 300° C.

Thereafter, the laminated nonwoven fabric was heated at a temperature of up to 900° C. under an argon gas atmosphere.

Next, the laminated nonwoven fabric was heated at a temperature of up to 2800° C. in a graphitizing furnace.

In a manner mentioned above, the graphitized carbon fiber nonwoven fabric in accordance with the present invention was obtained.

Figure 5:
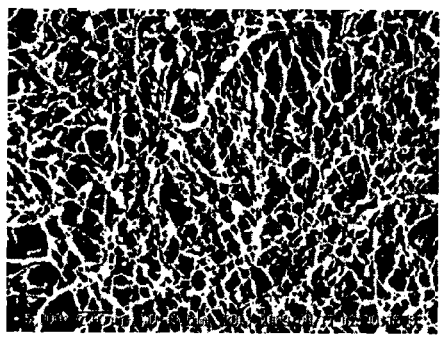
FIG. 5 is an SEM photograph.

The SEM photograph of the graphitized carbon fiber nonwoven fabric obtained in this example (SEM apparatus: name of apparatus: VE-8800 manufactured by KEYENCE CORPORATION) is shown in FIG. 5. According to the above SEM photograph, the fiber constituting the nonwoven fabric was fiber having irregularities. That is, the aforementioned fiber included a large diameter portion (the diameter: approximately 500 to 1000 nm) and a small diameter portion (the diameter: approximately 100 to 200 nm). The length of the aforementioned large diameter portion was approximately 500 to 1000 nm. The length of the aforementioned small diameter portion (the distance between the aforementioned large diameter portion and the aforementioned large diameter portion) was approximately 500 to 1000 nm.

The thickness of the aforementioned nonwoven fabric was 125 μm and the weight thereof was 210 g/m². The BET surface area (measurement apparatus: manufactured by Shimadzu Corporation) was 10.8 m²/g.

Figure 6:
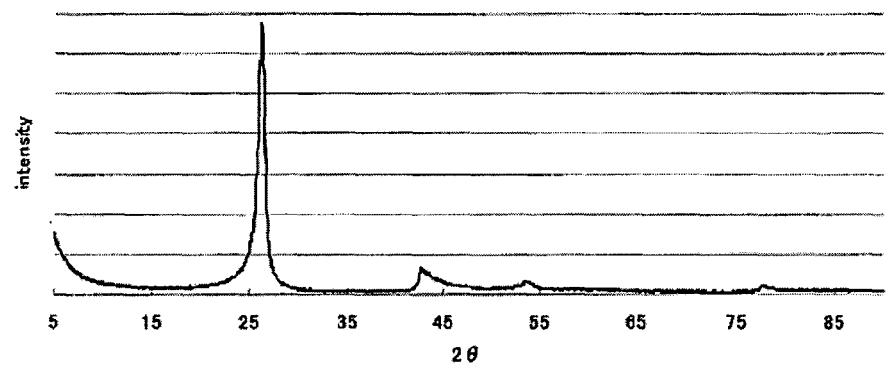
FIG. 6 is an XRD chart.

The XRD measurement result of the graphitized carbon fiber nonwoven fabric obtained in this example (XRD apparatus: manufactured by Rigaku Corporation) is shown in FIG. 6. The half width in this maximum peak was 0.95°.

Figure 7:
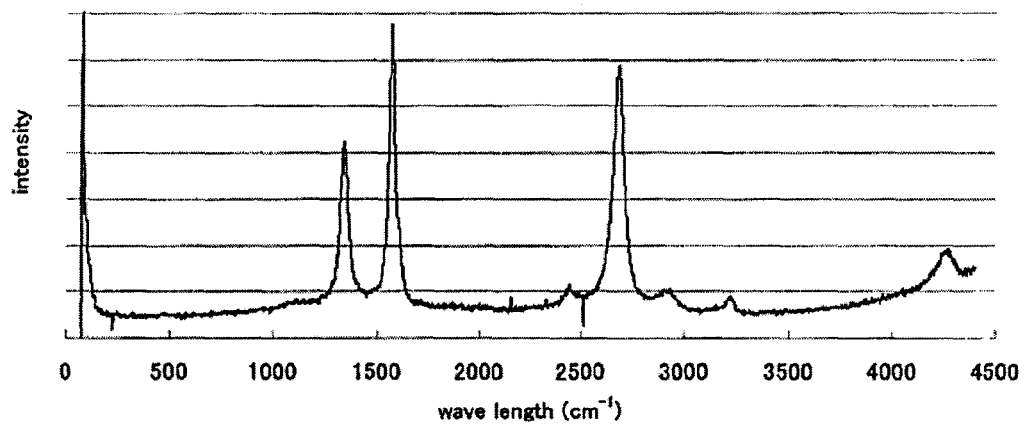
FIG. 7 is Raman scattering spectra.

The Raman measurement result of the graphitized carbon fiber nonwoven fabric obtained in this example (Raman measurement apparatus: manufactured by Shimadzu Corporation) is shown in FIG. 7. According to this, ID/IG was 0.87.

Figure 8:
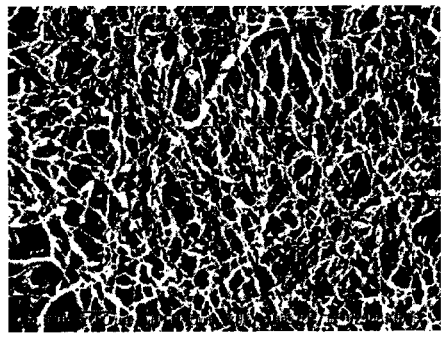
FIG. 8 is an image obtained by processing the image employed for measuring $L/(S)^{1/2}$.

The S/L measurement was performed by employing the above-mentioned SEM photograph. That is, imageJ (US National Institute of Mental Health/National Institute of Neurological Disorders and Stroke, Research Support Branch HP http://rsb.info.nih.gov/ij/index.html) was employed. The carbon fiber portion and the portion other than the carbon fiber were separated, and the area and the length of the circumference of the carbon fiber portion were measured. The image subjected to the processing is shown in FIG. 8. As a result, $L/(S)^{1/2}=140$ was yielded. As a result of measuring the similar image, (the maximum value in the large diameter portion)/(the minimum value in the small diameter portion)=10 was yielded.

Example 2

Figure 9:
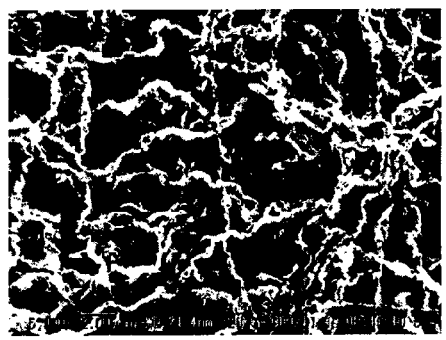
FIG. 9 is an SEM photograph.
Figure 10:
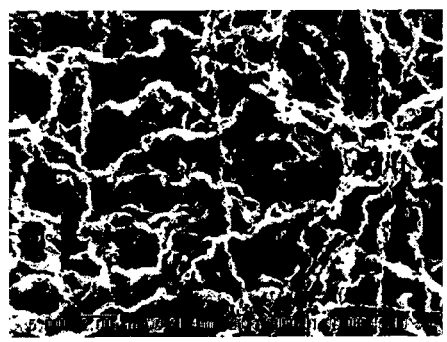
FIG. 10 is an image obtained by processing the image employed for measuring $L/(S)^{1/2}$.

The processing similar to that of the example 1 was performed except that an amount of the mesophase pitch was 100 g. A result thereof is shown in Table 1. The SEM photograph of the graphitized carbon fiber nonwoven fabric of this example (SEM apparatus: VE-8800 manufactured by KEYENCE CORPORATION) is shown in FIG. 9. Further, the image employed for an image analysis of the SEM photograph is shown in FIG. 10.

Example 3

Polyethylene oxide of 100 g (product name: Polyethylene Glycol 2,000,000: produced by Wako Pure Chemistry Industries, Ltd.), mesophase pitch of 200 g (product name: AR) and water of 700 g were mixed with the beads mill. This allowed the mesophase pitch dispersion liquid having polyethylene oxide dissolved therein to be prepared. The particle diameter of the carbon particles within this dispersion liquid was 150 nm (measuring apparatus: LA-950). The viscosity of the dispersion liquid was 100 mPa·S (measuring apparatus: BH type Viscometer).

The electrospinning was performed similarly to that of the example 1 by employing this dispersion liquid. That is, the nonwoven fabric made of the carbon fiber precursors was produced on the collector.

The above-mentioned nonwoven fabric was laminated. This laminated nonwoven fabric was heated for one hour at a temperature of 100° C. in the air. Thereafter, it was heated for one hour at a temperature of 200° C.

Thereafter, the laminated nonwoven fabric was heated at a temperature of up to 900° C. under the argon gas atmosphere.

Next, the laminated nonwoven fabric was heated at a temperature of up to 2400° C. in the graphitizing furnace.

In a manner mentioned above, the graphitized carbon fiber nonwoven fabric in accordance with the present invention was obtained.

Properties of the nonwoven fabric of this example are shown in Table 1.

Example 4

Polyacrylic acid of 20 g (product name: AQUALIC AS58: produced by NIPPON SHOKUBAI CO., LTD), mesophase pitch of 30 g (product name: AR) and water of 950 g were mixed with the beads mill. This allowed the mesophase pitch dispersion liquid having polyacrylic acid dissolved therein to be prepared. The particle diameter of the carbon particles within this dispersion liquid was 400 nm (measuring apparatus: LA-950). The viscosity of the dispersion liquid was 120 mPa·S (measuring apparatus: BH type Viscometer).

The electrospinning was performed similarly to that of the example 1 by employing this dispersion liquid. That is, the nonwoven fabric made of the carbon fiber precursors was produced on the collector.

The above-mentioned nonwoven fabric was laminated. This laminated nonwoven fabric was heated for one hour at a temperature of 150° C. in the air. Thereafter, it was heated for one hour at a temperature of 300° C.

Thereafter, the laminated nonwoven fabric was heated at a temperature of up to 900° C. under the argon gas atmosphere.

Next, the laminated nonwoven fabric was heated at a temperature of up to 2800° C. in the graphitizing furnace.

In a manner mentioned above, the graphitized carbon fiber nonwoven fabric in accordance with the present invention was obtained.

Properties of the nonwoven fabric of this example are shown in Table 1.

Example 5

Polyvinylbutyral of 100 g (product name: Mowital: produced by KURARAY CO. LTD.), mesophase pitch of 100 g (product name: AR) and isopropyl alcohol of 800 g were mixed with the beads mill. This allowed the mesophase pitch dispersion liquid having polyvinylbutyral dissolved therein to be prepared. The particle diameter of the carbon particles within this dispersion liquid was 350 nm (measuring apparatus: LA-950). The viscosity of the dispersion liquid was 320 mPa·S (measuring apparatus: BH type Viscometer).

The electrospinning was performed similarly to that of the example 1 by employing this dispersion liquid. That is, the nonwoven fabric made of the carbon fiber precursors was produced on the collector.

The obtained nonwoven fabric was heated for two hours at a temperature of 150° C. in the air. Thereafter, it was heated for one hour at a temperature of 300° C.

Thereafter, the nonwoven fabric was heated at a temperature of up to 900° C. under the argon gas atmosphere.

Next, the nonwoven fabric was heated at a temperature of up to 2800° C. in the graphitizing furnace.

In a manner mentioned above, the graphitized carbon fiber nonwoven fabric in accordance with the present invention was obtained.

Properties of the nonwoven fabric of this example are shown in Table 1.

Example 6

The processing was performed similarly to that of the example 1 except that an amount of the mesophase pitch was 190 g. A result thereof is shown in Table 1.

Example 7

The processing was performed similarly to that of the example 1 except that an amount of the mesophase pitch was 150 g. A result thereof is shown in Table 1.

Example 8

The processing was performed similarly to that of the example 1 except that an amount of the mesophase pitch was 70 g. A result thereof is shown in Table 1.

Example 9

The processing was performed similarly to that of the example 1 except that an amount of the mesophase pitch was 50 g. A result thereof is shown in Table 1.

Example 10

The processing was performed similarly to that of the example 1 except that an amount of the mesophase pitch was 30 g. A result thereof is shown in Table 2.

Example 11

The processing was performed similarly to that of the example 1 except that an amount of the mesophase pitch was 220 g. The result thereof is shown in Table 2.

Example 12

The processing was performed similarly to that of the example 1 except that an amount of the mesophase pitch was 10 g. The result thereof is shown in Table 2.

Example 13

The processing was performed similarly to that of the example 1 except that an amount of polyvinyl alcohol is 60 g, an amount of the mesophase pitch was 70 g, and water is 870 g. The result thereof is shown in Table 2.

Figure 11:
FIG. 11 is an SEM photograph.

The SEM photograph of the graphitized carbon fiber nonwoven fabric of this example (SEM apparatus: VE-8800 manufactured by KEYENCE CORPORATION) is shown in FIG. 11.

Example 14

Carboxymethylcellulose amine salt of 50 g (product name: Ammonium CMC DN-400H: produced by DAICEL CHEMICAL INDUSTRIES, LTD.), mesophase pitch of 50 g (product name: AR) and water of 900 g were mixed with the beads mill. This allowed the mesophase pitch dispersion liquid having carboxymethylcellulose amine salt dissolved therein to be prepared. The particle diameter of the carbon particles within this dispersion liquid was 230 nm (measuring apparatus: LA-950). The viscosity of the dispersion liquid was 8300 mPa·S (measuring apparatus: BH type Viscometer).

The electro spinning was performed similarly to that of the example 1 by employing this dispersion liquid. That is, the nonwoven fabric made of the carbon fiber precursors was produced on the collector.

The obtained nonwoven fabric was heated for one hour at a temperature of 300° C. in the air.

Thereafter, the nonwoven fabric was heated at a temperature of up to 900° C. under the argon gas atmosphere.

Next, the nonwoven fabric was heated at a temperature of up to 2800° C. in the graphitizing furnace.

In a manner mentioned above, the graphitized carbon fiber nonwoven fabric in accordance with the present invention was obtained.

Properties of the nonwoven fabric of this example are shown in Table 2.

Example 15

Polyvinyl alcohol of 100 g (product name: POVAL 117), mesophase pitch of 20 g (product name: AR) and water of 800 g were mixed with the beads mill. This allowed the mesophase pitch dispersion liquid having polyvinyl alcohol dissolved therein to be prepared. The particle diameter of the carbon particles within this dispersion liquid (measuring apparatus: LA-950) was 200 nm. The viscosity of the dispersion liquid was 4300 mPa·S (measuring apparatus: BH type Viscometer).

The electrospinning was performed similarly to that of the example 1 by employing this dispersion liquid. That is, the nonwoven fabric made of the carbon fiber precursors was produced on the collector.

The above-mentioned nonwoven fabric was laminated. This laminated nonwoven fabric was heated for ten minutes at a temperature of 150° C. in the air. Thereafter, it was heated for one hour at a temperature of 300° C.

Thereafter, the laminated nonwoven fabric was heated at a temperature of up to 900° C. under the argon gas atmosphere.

Next, the laminated nonwoven fabric was heated at a temperature of up to 2400° C. in the graphitizing furnace.

In a manner mentioned above, the graphitized carbon fiber nonwoven fabric in accordance with the present invention was obtained.

Properties of the nonwoven fabric of this example are shown in Table 2.

Comparative Example 1

The production of the nonwoven fabric was tried with melt flow method by employing the dispersion liquid of the example 1. However, the nonwoven fabric was not obtained.

Comparative Example 2

The processing was performed similarly to that of the example 1 except that, instead of the dispersion liquid of the example 1 (the mesophace pitch dispersion liquid having polyvinyl alcohol dissolved therein), a polyvinyl alcohol aqueous solution (polyvinyl alcohol (product name: POVAL 117)) of 100 g, and water 900 g were employed, and that the carbon black and the pitch were not included.

The diameter of the fiber of the nonwoven fabric obtained in this comparative example 2 was uniform (50 nm). That is, there was no fiber including both of the large diameter portion and the small diameter potion on a piece by piece basis.

Example 16

The carbon fiber nonwoven fabric obtained in the example 1 was pulverized by employing a mortar. The pulverizing allowed the carbon fiber to be obtained.

Figure 12:
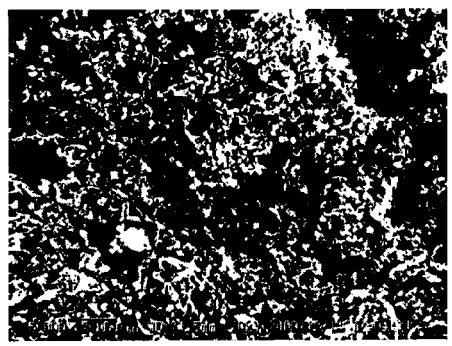
FIG. 12 is an SEM photograph.
Figure 13:
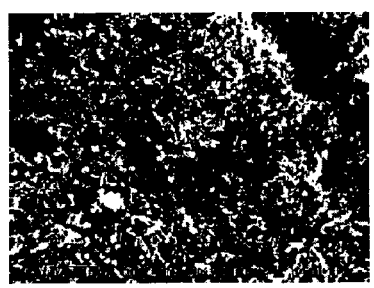
FIG. 13 is an image obtained by processing the image employed for measuring $L/(S)^{1/2}$.

An investigation similar to that of the example 1 was carried out for the above carbon fiber. A result thereof is shown in Table 2. The SEM photograph of the graphitized carbon fiber nonwoven fabric of this example (SEM apparatus: VE-8800 manufactured by KEYENCE CORPORATION) is shown in FIG. 12. Further, the image subjected to the processing employed for an image analysis of the SEM photograph is shown in FIG. 13.

Example 17

The processing was performed similarly to that of the example 16 except that the carbon fiber nonwoven fabric obtained in the example 13 was employed.

Figure 14:
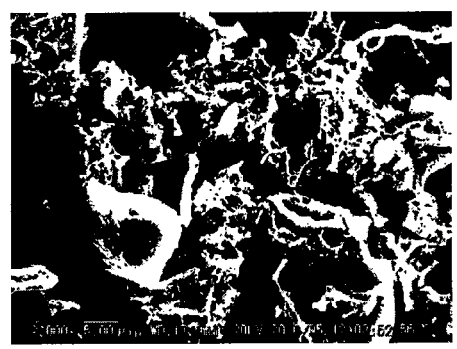
FIG. 14 is an SEM photograph.

An investigation similar to that of the example 1 was carried out for the above carbon fiber. A result thereof is shown in Table 2. The SEM photograph of the graphitized carbon fiber nonwoven fabric of this example (SEM apparatus: VE-8800 manufactured by KEYENCE CORPORATION) is shown in FIG. 14.

Comparative Example 3

This is an example described in Non-Patent literature 1. Thermoplastic resin (poly(4-methyl pentene-1): TPX: Grade RT-18 produced by Mitsui Chemicals, Inc.) of 70 g, mesophase pitch of 30 g (product name: AR) were mixed with the ball mill (P-7: manufactured by Fritsch GmbH.). This mixture was kneaded by a kneader (apparatus name: Laboratory Mixing Extruder Model CS-194AV: manufactured by ATLAS ELECTRIC DEVICES, COMPANY) at a temperature of 240° C. The spinning was performed with the melt blow method by employing the above kneaded product. The kneading conditions are as follows. The nozzle is a single-hole nozzle with a diameter of 0.5 mm (manufactured by NIPPON NOZZLE CO., LTD). The spinning temperature is 380° C. The resin pressure is 0.4 MPa. The blow pressure is 3.5 MPa. The obtained fiber was thermally treated for 24 hours at a temperature of 160° C. under the oxygen atmosphere. Thereafter, the obtained fiber was thermally treated for one hour at a temperature of 900° C. and thermally treated for thirty minutes at a temperature of 3000° C. under the nitrogen atmosphere.

Figure 15:
FIG. 15 is an SEM photograph.

The SEM photograph of the fiber obtained in such a manner is shown in FIG. 15. The fiber diameter was 100 nm to 5 μm. The dispersion of the fiber diameters between each fiber and the other was recognized to be large. However, the fiber diameter was uniform on a piece by piece basis. That is, there was no fiber including both of the large diameter portion and the small diameter potion.

Comparative Example 4

This an example described in Non-Patent literature 2. Polyacrylonitrile (molecular weight 86220: produced by Aldrich Corporation) of 5 g was dissolved in DMF of 45 ml. And, the electrospinning (voltage: 25 kV, the collecting plate: aluminum foil and nozzle: 0.5 mm φ) was performed. The obtained nonwoven fabric was thermally treated for one hour at a temperature of 280° C. in the air. Thereafter, it was thermally treated at a temperature of 2800° C. in the argon.

Figure 16:
FIG. 16 is an SEM photograph.

The SEM photograph of the obtained fiber is shown in FIG. 16. The fiber diameter was uniform (100 nm). That is, there was no fiber including both of the large diameter portion and the small diameter potion on a piece by piece basis.

Example 18

Figure 17:
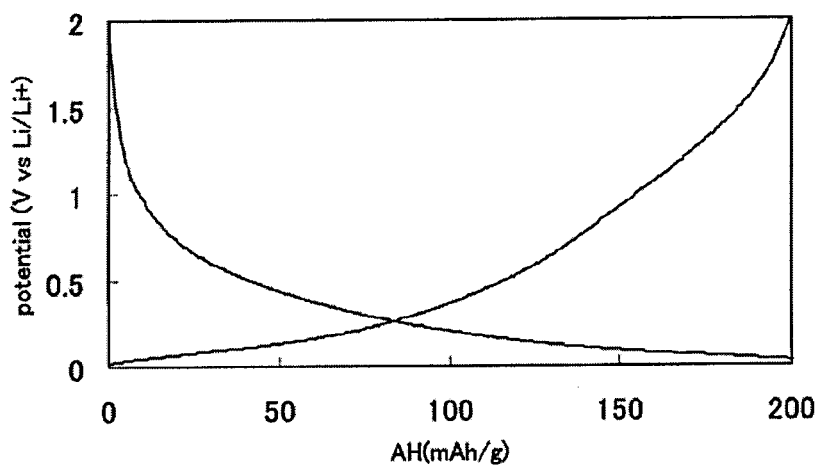
FIG. 17 is a charge/discharge characteristic chart.

The electrodes were produced. The anode active material of the above electrodes is the fiber of the example 15. Lithium was employed for the counter electrodes, and a charge/discharge measurement was made. This result is shown in FIG. 17. A charge/discharge capacity was 200 mAh/g.

Thus, the carbon fiber of the example 13 is preferred as the negative electrode material for the lithium-ion secondary battery.

Example 19

Figure 18:
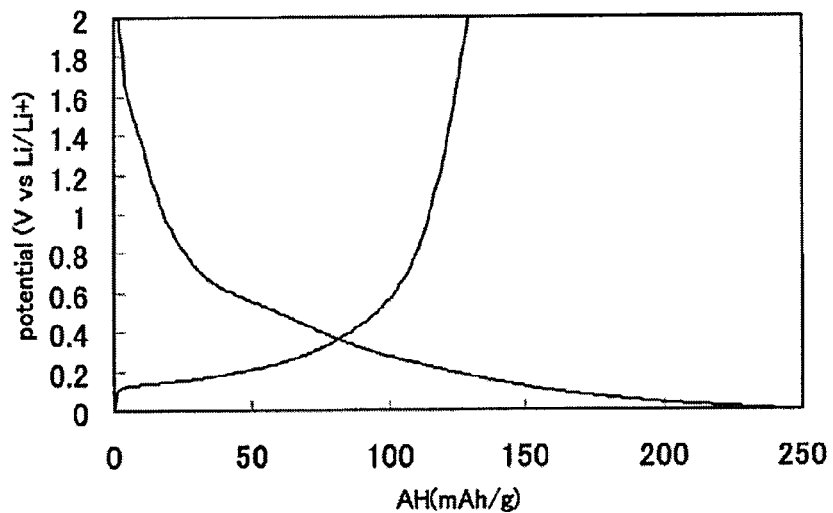
FIG. 18 is a charge/discharge characteristic chart.

The electrodes were produced. The anode active material of the above electrodes is the nonwoven fabric of the example 1. Lithium was employed for the counter electrodes, and a charge/discharge measurement was made. This result is shown in FIG. 18.

Thus, the nonwoven fabric of the example 1 is preferred as the negative electrode material for the lithium-ion secondary battery.

Example 20

The electrodes were produced. The anode active material of the above electrodes is the nonwoven fabric of the example 6. Lithium was employed for the counter electrodes, and a charge/discharge measurement was made. As a result, a charge/discharge capacity was 210 mAh/g.

Thus, the nonwoven fabric of the example 6 is preferred as the negative electrode material for the lithium-ion secondary battery.

Example 21

The electrodes were produced. The anode active material of the above electrodes is the nonwoven fabric of the example 10. Lithium was employed for the counter electrodes, and a charge/discharge measurement was made. As a result, the charge/discharge capacity was 150 mAh/g.

Thus, the c nonwoven fabric of the example 10 is preferred as the negative electrode material for the lithium-ion secondary battery.

Example 22

The electrodes were produced. The anode active material of the above electrodes is the nonwoven fabric of the example 11. Lithium was employed for the counter electrodes, and the charge/discharge measurement was made. As a result, the charge/discharge capacity was 220 mAh/g.

Thus, the nonwoven fabric of the example 11 can be employed for the negative electrode materials for the lithium-ion secondary battery. However, the nonwoven fabric of the example 11 is difficult to handle as compared with that of the example 1.

Example 23

The electrodes were produced. The anode active material of the above electrodes is the nonwoven fabric of the example 12.

Lithium was employed for the counter electrodes, and the charge/discharge measurement was made. As a result, the charge/discharge capacity was 100 mAh/g.

Thus, the nonwoven fabric of the example 12 can be employed for the negative electrode materials for the lithium-ion secondary battery. However, the charge/discharge capacity declined as compared with that of the example 1.

Comparative Example 5

The electrodes were produced. The anode active material of the above electrodes is the nonwoven fabric of the comparative example 2. Lithium was employed for the counter electrodes, and the charge/discharge measurement was made. As a result, the charge/discharge capacity was 0 mAh/g, and the above electrodes did not function as the negative electrode material at all.

Comparative Example 6

Figure 19:
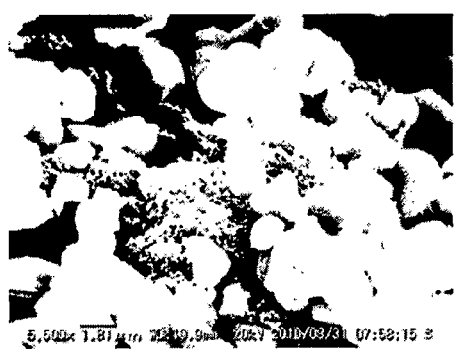
FIG. 19 is an SEM photograph.

Lithium cobalt oxide (produced by Hohsen Corp.) of 96 g, polyvinylidene difluoride (produced by Sigma-Aldrich Corporation) of 2 g and acetylene black (produced by DENKI KAGAKU KOGYO KABUSHIKI KAISYA) of 2 g were mixed. Addition of N-methylpyrrolidone hereto yielded the paste-like mixture. The copper foil was coated with the above paste-like mixture by a bar-coater so that a membrane thickness after the drying was 20 μm. Thereafter, the drying was performed, and the positive electrodes for the lithium-ion secondary batteries were produced. The SEM photograph is shown in FIG. 19.

The surface electric resistance of the above positive electrodes was measured with a four-point probe method (manufactured by Mitsubishi Chemical Analytech Co., Ltd.). A result thereof was 0.4 Ω/□.

Example 24

Figure 20:
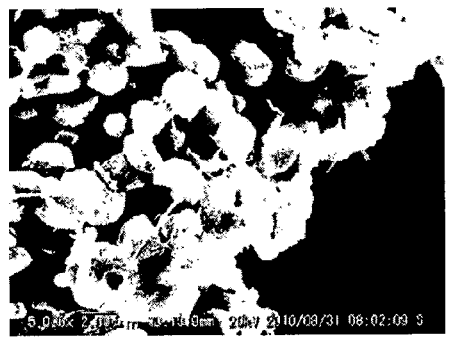
FIG. 20 is an SEM photograph.

The processing was performed similarly to that of the comparative example 6 except that the carbon fiber of 2 g obtained in the example 17 was employed instead of acetylene black. And, the positive electrodes for the lithium-ion secondary batteries were produced. The SEM photograph is shown in FIG. 20.

The surface electrical resistance of the above positive electrodes was measured with the four-point probe method (manufactured by Mitsubishi chemical Analytech Co., Ltd.). A result thereof was 0.2 Ω/□.

Comparative Example 7

The Si membrane (the membrane thickness: 500 nm) was mounted on the copper foil with the vapor deposition (vapor deposition apparatus: UEP-4000 manufactured by ULVAC, Inc.). And the negative electrodes were produced. Lithium was employed for the counter electrodes.

Figure 21:
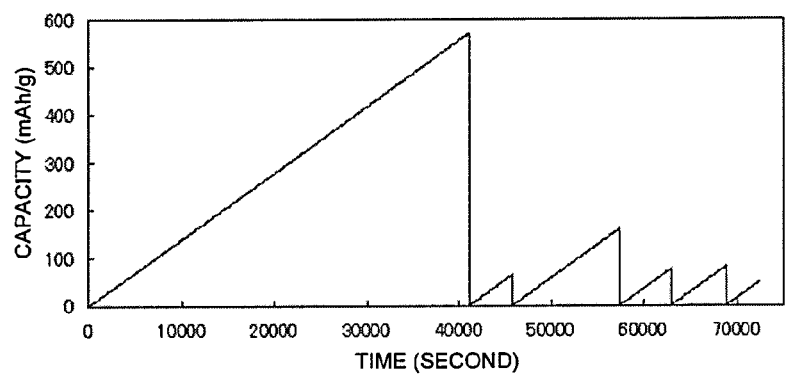
FIG. 21 is a charge/discharge characteristic chart.

The charge/discharge measurement was made. A result thereof was shown in FIG. 21. The charge/discharge capacity of the first cycle was 580 mAh/g. The capacity declined during repetition of the charge/discharge cycle.

Example 25

The processing was performed similarly to that of the comparative example 7 except that the carbon fiber nonwoven fabric obtained in the example 13 was employed instead of the copper foil. An amount of Si was 17% by mass per the carbon fiber nonwoven fabric. Lithium was employed for the counter electrodes.

Figure 22:
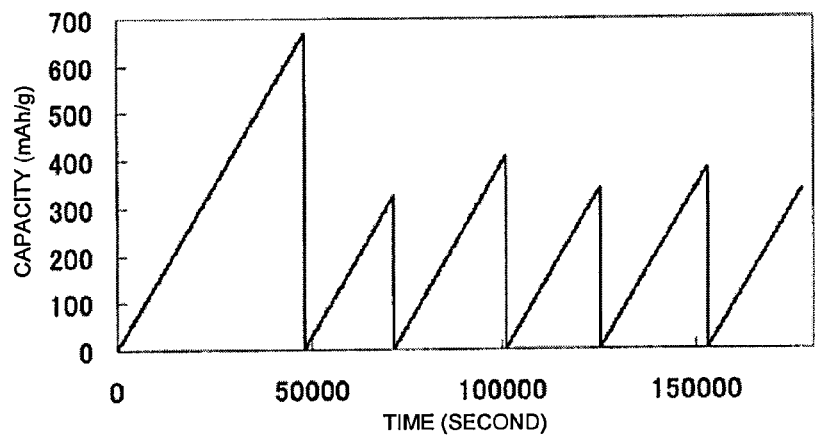
FIG. 22 is a charge/discharge characteristic chart.

The charge/discharge measurement was made. A result thereof was shown in FIG. 22. The charge/discharge capacity was 667 mAh/g. The capacity did not decline even though the charge/discharge cycle was repeated. It can be grasped that the cyclic property was enhanced as compared with the comparative example 7 employing the copper foil for the mother material.

Example 26

Figure 24:
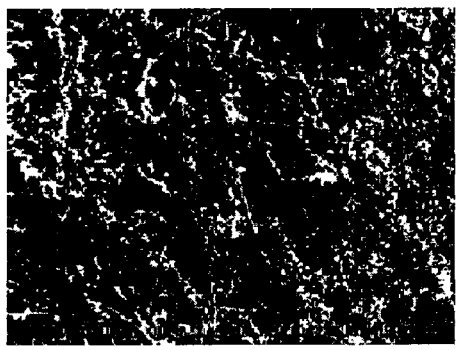
FIG. 24 is an SEM photograph.

The nonwoven fabric of the example 8 was coated with a mixed paste of platinum-supported carbon and polymer electrolyte (produced by Chemix Inc.). After the coating, the above nonwoven fabric was dried for ten minutes at a temperature of 100° C. And, the anode electrode for the solid polymer type fuel cell was produced. The cross-sectional schematic view of the above anode electrode is shown in FIG. 23, and the SEM photograph of the obtained sample is shown in FIG. 24.

The obtained anode electrode, and the cathode electrode, the solid polymer electrolyte membrane and the carbon separator each of which was produced by Chemix Inc. were employed, and the solid polymer type fuel cells were produced.

As a result of introducing hydrogen from the anode and measuring an open-circuit voltage, the open-circuit voltage was 0.98 V.

Example 27

Lithium was inserted into the nonwoven fabric of the example 8 by a half of the maximum capacity with a method similar to that of the example 17, and the negative electrodes were produced. The positive electrodes were produced by use of the active carbon. The electrolyte solution was prepared by employing ethylene carbonate containing lithium hexafluorophosphate and diethyl carbonate.

Figure 25:
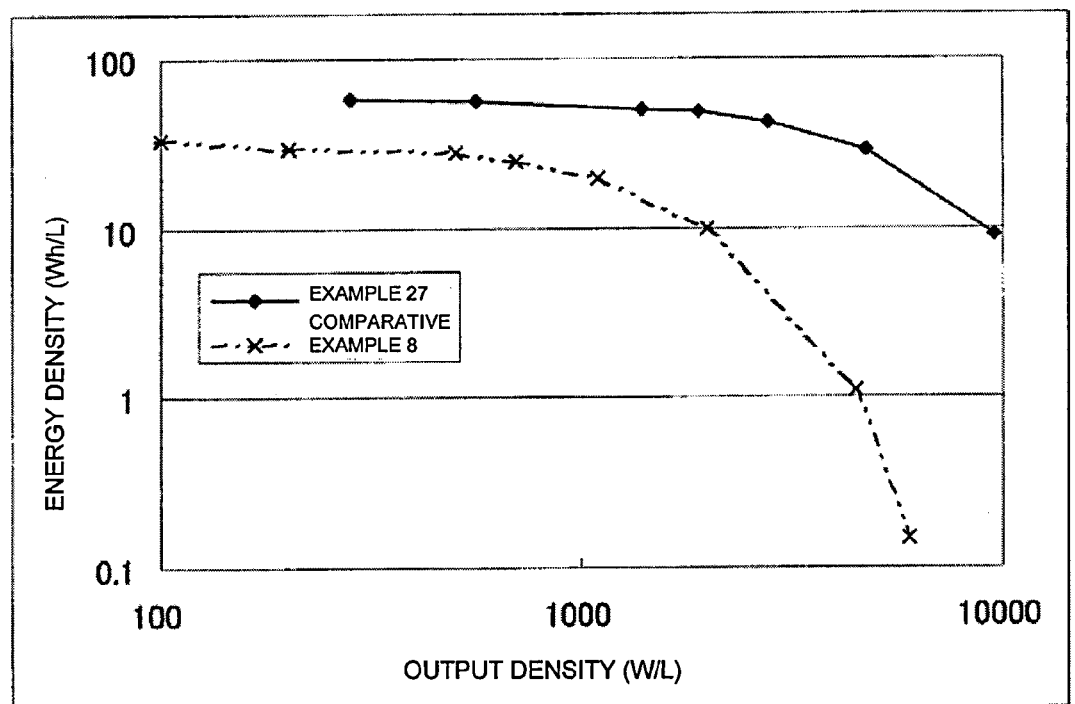
FIG. 25 is an energy density/output density characteristic chart.

After the charge up to 4 v was carried out, the discharge was carried out up to 3 v at a constant output. A correlation between an energy density and an output density was measured. A result thereof is shown in FIG. 25.

It can be grasped that the capacity is large in a high-rate area as compared with that of the comparative example 7.

Comparative Example 8

This an example described in Non-Patent literature 3. A measurement similar to that of the example 27 was made except that the graphite particles having a diameter of 10 μm were employed for the negative electrode. A result thereof is shown in FIG. 25.

Example 28

A mixed solution of a dispersion liquid of the carbon particles having a diameter of 400 nm, and a dispersion liquid of silicon oxide having a diameter of 10 nm was prepared. The above mixed solution was filtered with the nonwoven fabric (filter) of the example 13. As a result, only silicon oxide having a diameter of 10 nm was filtered (passed).

[Properties]

TABLE 1

|  | EX. 1 | EX. 2 | EX. 3 | EX. 4 | EX. 5 | EX. 6 | EX. 7 | EX. 8 | EX. 9 |
|---|---|---|---|---|---|---|---|---|---|
| Resin | PVA | PVA | PEO | PAA | PVB | PVA | PVA | PVA | PVA |
| Carbon/resin (wt/wt) | 120/100 | 100/100 | 200/100 | 30/20 | 100/100 | 190/100 | 150/100 | 70/100 | 50/100 |
| Small diameter portion minimum value (nm) | 100 | 50 | 100 | 20 | 200 | 50 | 600 | 300 | 30 |
| Large diameter portion minimum value (nm) | 500 | 300 | 1000 | 30 | 250 | 1500 | 1000 | 500 | 100 |
| Large diameter portion maximum value (nm) | 1000 | 1000 | 1500 | 50 | 300 | 2000 | 1500 | 700 | 200 |
| Small diameter portion length (nm) | 1000 | 100 | 600 | 100 | 200 | 20 | 300 | 2000 | 3000 |
| Large diameter portion length (nm) | 1000 | 2000 | 1000 | 100 | 500 | 6000 | 3000 | 500 | 300 |
| Nonwoven fabric thickness (μm) | 125 | 130 | 1010 | 0.5 | 10 | 200 | 185 | 210 | 165 |
| Nonwoven fabric weight (g/m$^2$) | 210 | 200 | 820 | 0.9 | 13 | 195 | 165 | 155 | 172 |
| BET surface area (m$^2$/g) | 10.8 | 5.8 | 15.6 | 5.4 | 8.6 | 5.6 | 4.9 | 16 | 24 |
| XRD (half width) | 0.95 | 0.50 | 0.20 | 0.30 | 1.6 | 0.30 | 0.45 | 1.50 | 1.65 |
| Raman scattering (ID/IG) | 0.67 | 0.28 | 0.75 | 1.53 | 1.32 | 0.23 | 0.35 | 0.53 | 0.85 |
| SEM observation (L/(S)$^{1/2}$) | 140 | 84 | 75 | 230 | 65 | 43 | 86 | 164 | 153 |
| SEM observation (*) | 10 | 20 | 15 | 2.5 | 1.5 | 40 | 1.6 | 2.3 | 6.7 |

TABLE 2

|  | EX. 10 | EX. 11 | EX. 12 | EX. 13 | EX. 14 | EX. 15 | EX. 16 | EX. 17 |
|---|---|---|---|---|---|---|---|---|
| Resin | PVA | PVA | PVA | PVA | CMC | PVA | PVA | PVA |
| Carbon/resin (wt/wt) | 30/100 | 220/100 | 10/100 | 60/70 | 50/50 | 20/100 | 120/100 | 60/70 |
| Small diameter portion minimum value (nm) | 10 | 50 | 30 | 100 | 500 | 20 | 100 | 100 |
| Large diameter portion minimum value (nm) | 30 | 1500 | 35 | 150 | 1000 | 30 | 500 | 150 |
| Large diameter portion maximum value (nm) | 100 | 2500 | 40 | 500 | 1500 | 100 | 1000 | 500 |
| Small diameter portion length (nm) | 8000 | 50 | 50 | 100 | 100 | 3000 | 1000 | 100 |
| Large diameter portion length (nm) | 100 | 2500 | 50 | 200 | 1000 | 300 | 1000 | 200 |
| Nonwoven fabric thickness (μm) | 150 | 100 | 50 | 30 | 10 | 300 | — | — |
| Nonwoven fabric weight (g/m$^2$) | 130 | 68 | 34 | 10 | 15 | 280 | — | — |
| BET surface area (m$^2$/g) | 35 | 5.4 | 45 | 10.4 | 8.9 | 26 | 15.6 | 15.2 |
| XRD (half width) | 1.50 | 0.37 | 1.57 | 0.70 | 1.72 | 1.85 | 0.95 | 0.70 |
| Raman scattering (ID/IG) | 0.75 | 0.31 | 1.02 | 0.25 | 1.64 | 1.05 | 0.87 | 0.25 |
| SEM observation (L/(S)$^{1/2}$) | 264 | 5 | 180 | 97 | 75 | 120 | 110 | 86 |
| SEM observation (*) | 10 | 50 | 1.3 | 5.0 | 3.0 | 5.0 | 10 | 5.0 |

*SEM observation (*): (maximum value in large diameter portion)/(minimum value in small diameter portion)

This application is based upon and claims the benefit of priority from Japanese patent application No. 2010-11457, filed on Jan. 21, 2010, the disclosure of which is incorporated herein in its entirety by reference.

REFERENCE SIGNS LIST

1 and 5 spinning dope supplying apparatus
2 and 6 exits
3 voltage applying apparatus
4 collector
7 and 9 anode active materials
8 and 10 current collecting electrode plates
11 porous carbon electrode material
12 catalyst layer

The invention claimed is:

1. A method of producing a carbon fiber nonwoven fabric, the method comprising:

preparing a dispersion liquid comprising a resin and a pitch;

electrospinning from the dispersion liquid to obtain a nonwoven fabric comprising carbon fiber precursors; and modifying the carbon fiber precursors of the nonwoven fabric into carbon fiber, to obtain a carbon fiber nonwoven fabric, wherein the carbon fiber comprises a large diameter portion and a small diameter portion.

2. The method of claim 1, wherein the modifying comprises heating the nonwoven fabric to 50 to 4000° C.

3. The method of claim 1, wherein the modifying comprises removing the resin from the nonwoven fabric.

4. The method of claim 3, wherein the removing comprises heating the nonwoven fabric under an oxidizing gas atmosphere.

5. The method of claim 1, wherein the modifying comprises performing a carbonizing process for the nonwoven fabric.

6. The method of claim 5, wherein the modifying comprises performing a graphitizing process for the nonwoven fabric.

7. The method claim 6, wherein the graphitizing process comprises heating the nonwoven fabric under an inert atmosphere.

8. The method of claim 1, wherein the resin is water-soluble.

9. The method of claim 1, wherein the resin is pyrolytic.

10. The method of claim 1, wherein the resin is a polyvinyl alcohol.

11. The method of claim 1, wherein the pitch is a mesophase pitch.

12. The method of claim 1, wherein the pitch has a particle diameter of 1 nm to 10 μm.

13. The method of claim 1, wherein the pitch has a particle diameter of 100 nm to 1 μm.

14. The method of claim 1, wherein the dispersion liquid comprises 20 to 200 parts by mass per 100 parts by mass of the resin.

15. The method of claim 1, wherein the dispersion liquid further comprises at least one solvent.

16. The method of claim 15, wherein the solvent is water.

17. The method of claim 15, wherein the solvent comprises at least one member selected from the group consisting of water, acetic acid, formic acid, methanol, ethanol, propanol, butanol, isobutyl alcohol, amyl alcohol, isoamyl alcohol, cyclohexanol, ethyl acetate, butyl acetate, diethyl ether, dibutyl ether, tetrahydrofuran, acetone, methyl ethyl ketone, methyl isobutyl ketone, N,N'-dimetyl formamide, dimetyl sulfoxide, acetonitrile, dimethyl acetamide, chloroform, tetrachloromethane and hexafluoroisopropyl alcohol.

18. The method of claim 15, wherein the solvent is comprises at least one alcohol.

19. The method of claim 1, wherein the carbon fiber comprises a large diameter portion having a diameter of 20 nm to 2 μm and a small diameter portion having a diameter of 10 nm to 1 μm.

20. The method of claim 1, wherein the carbon fiber comprises a large diameter portion having a diameter of 50 nm to 1 μm and a small diameter portion having a diameter of 20 nm to 500 nm.

21. The method of claim 1, wherein the (a maximum value of the diameter in the aforementioned large diameter portion)/(a minimum value of the diameter in the aforementioned small diameter portion)=1.1 to 100.

22. The method of claim 1, wherein the (a maximum value of the diameter in the aforementioned large diameter portion)/(a minimum value of the diameter in the aforementioned small diameter portion)=2 to 50.

23. The method of claim 1, wherein the full length of the carbon fiber is 0.1 to 1000 μm.

24. The method of claim 1, wherein the large diameter portion has a diameter of 20 nm to 5 μm and the small diameter portion has a diameter of 10 nm to 3 μm.

25. The method of claim 1, wherein the large diameter portion has a diameter of 20 nm to 5 μm and the small diameter portion has a diameter of 10 nm to 3 μm, and wherein the average diameter of the large diameter portion is greater than the average diameter of the small diameter portion.

* * * * *